(12) United States Patent
Bandosz

(10) Patent No.: US 8,937,032 B2
(45) Date of Patent: Jan. 20, 2015

(54) CATALYTIC ADSORBENTS OBTAINED FROM MUNICIPAL SLUDGES, INDUSTRIAL SLUDGES, COMPOST AND TOBACCO WASTE AND A ROTARY DRYING PROCESS FOR THEIR PRODUCTION

(75) Inventor: Teresa J. Bandosz, Teaneck, NJ (US)

(73) Assignee: Research Foundation of the City University of New York, New York, NY (US)

( * ) Notice: Subject to any disclaimer, the term of this patent is extended or adjusted under 35 U.S.C. 154(b) by 252 days.

(21) Appl. No.: 13/467,027

(22) Filed: May 8, 2012

(65) Prior Publication Data

US 2013/0123099 A1 May 16, 2013

Related U.S. Application Data

(63) Continuation of application No. 12/136,527, filed on Jun. 10, 2008, now abandoned, which is a continuation-in-part of application No. 11/530,298, filed on Sep. 8, 2006, now abandoned.

(60) Provisional application No. 60/801,545, filed on May 17, 2006, provisional application No. 60/782,593, filed on Mar. 14, 2006, provisional application No. 60/715,788, filed on Sep. 8, 2005.

(51) Int. Cl.
| | | |
|---|---|---|
| *C01B 31/08* | (2006.01) | |
| *B01D 53/50* | (2006.01) | |
| *B01D 53/54* | (2006.01) | |
| *B01D 53/56* | (2006.01) | |
| *B01D 53/52* | (2006.01) | |
| *B01J 21/18* | (2006.01) | |
| *B01D 53/02* | (2006.01) | |
| *B01D 53/04* | (2006.01) | |

(52) U.S. Cl.
CPC .......... *B01J 21/18* (2013.01); *B01D 2257/408* (2013.01); *B01D 2259/40088* (2013.01); *B01D 53/508* (2013.01); *B01D 53/54* (2013.01); *B01D 53/565* (2013.01); *B01D 2257/302* (2013.01); *B01D 2257/304* (2013.01); *B01D 53/52* (2013.01); *B01D 2253/308* (2013.01); *B01D 53/04* (2013.01); *B01D 2253/112* (2013.01); *B01D 2253/311* (2013.01); *B01D 53/02* (2013.01); *B01D 2253/102* (2013.01); *B01D 2253/104* (2013.01)
USPC ...................................................... 502/436

(58) Field of Classification Search
USPC ...................................................... 502/436
See application file for complete search history.

(56) References Cited

U.S. PATENT DOCUMENTS

| | | | |
|---|---|---|---|
| 3,619,420 | A | 11/1971 | Kemmer et al. |
| 3,887,461 | A | 6/1975 | Nickerson et al. |
| 3,998,756 | A | 12/1976 | Sutherland |
| 3,998,757 | A | 12/1976 | Foster |
| 4,122,036 | A | 10/1978 | Lewis |
| 4,818,505 | A | 4/1989 | Muller et al. |
| 5,338,462 | A | 8/1994 | Abe et al. |
| 5,356,849 | A | 10/1994 | Matviya et al. |
| 5,738,703 | A | 4/1998 | Bandurski |
| 6,030,922 | A | 2/2000 | Khalili et al. |
| 6,719,956 | B1 | 4/2004 | Gaur et al. |
| 6,962,616 | B1 | 11/2005 | Bandosz et al. |
| 2002/0100367 | A1 | 8/2002 | Bandosz et al. |
| 2004/0167019 | A1 | 8/2004 | Liang et al. |
| 2006/0014639 | A1 | 1/2006 | Bandosz et al. |
| 2011/0071022 | A1 | 3/2011 | Bandosz et al. |
| 2013/0059152 | A1 | 3/2013 | Bandosz et al. |

FOREIGN PATENT DOCUMENTS

| | | |
|---|---|---|
| CA | 2 451 444 | 1/2003 |
| DE | 4102557 | 7/1992 |
| EP | 0729783 | 9/1996 |
| GB | 1385453 | 2/1975 |
| JP | 11057399 | 3/1999 |
| JP | H11-60223 | 3/1999 |
| JP | 2000-319011 | 11/2000 |
| JP | 2004-073982 | 3/2004 |
| JP | 2005-145804 | 6/2005 |
| KR | 20020010170 | 2/2002 |
| KR | 100377968 | 3/2003 |
| KR | 100933055 | 12/2009 |
| KR | 20110019963 | 3/2011 |

(Continued)

OTHER PUBLICATIONS

Piskorz, J.; Scott, D.S.; Westerberg, I.B. Flash pyrolysis of sewage sludge; Ind. Proc. Eng. Chem. Des. Dev., 1996, 25:265-270.
Lu, G.Q.; Preparation and Evaluation of Adsorbents from Waste Carbonaceous Materials for Sox and Nox Removal . Environmental Progress 1996, 15:12.
Lu, G.Q.; Lau, D.D.; Characterization of Sewage Sludge-Derived Adsorbents for H2S Removal. Part 2: Surface and Pore Structural Evolution in Chemical Activation. Gas. Sep. Purif. 1996, 10:103.
Chiang, P.C.; You, J.H.; Use of Sewage Sludge for Manufacturing Adsorbents. Canadian J. Chem. Eng. 1987, 65:922.

(Continued)

*Primary Examiner* — Stuart Hendrickson
(74) *Attorney, Agent, or Firm* — Troutman Sanders LLP

(57) ABSTRACT

A method for producing an adsorbent, having the steps of combining a first sludge and a second material to form a mixture, thermally drying the mixture, and pyrolizing the mixture using at least four temperature zones wherein each temperature zone is set between about 600° C. and 1,100° C. The first sludge is a municipal sludge or an industrial sludge, and the second material is a compost material or one of municipal sludge or industrial sludge differing from the first sludge. The compost material is at least one of tobacco waste, waste paper and wood char, or a combination thereof. Further, the drying can happen in two stages. Each stage can include two separate temperatures.

10 Claims, 35 Drawing Sheets

(56) References Cited

FOREIGN PATENT DOCUMENTS

| KR | 20120116758 | 10/2012 |
|---|---|---|
| KR | 101309304 | 9/2013 |
| WO | 02/43858 | 6/2002 |
| WO | 2005/014156 | 2/2005 |

OTHER PUBLICATIONS

Lu, G.Q.; Low, J.C.F.; Lui, C.V.; Lua, A.C. Surface Area Development of Sewage Sludge During Pyrolysis. Fuel 1995, 74:344.

Katoh, H.; Kuniyoshi, I.' Hirai, M.; Shoda, M. Studies of the oxidation mechanism of sulphur-containing gases on wet activated carbon fibre; 1995 Elsevier Science B.V.

Adib, F.; Bagreev, A.; Bandosz, T.J.; Analysis of the Relationship between H2S Removal Capacity and Surface Properties of Unimpregnated Activated Carbons. Environmental Science & Technology; vol. 34, No. 4, 2000.

Adib, F.; Bagreev, A.; Bandosz, T.J.; Effect of Surface Characteristics of Wood-Based Acrtivated Carbons on Adsorption of Hydrogen Sulfide. Journal of Colloid and Interface Science 214, 407-415 (1999).

Adib, F; Bagreev, A.; Bandosz, T.J.; Effect of pH and Surface Chemistry on the Mechanism of H2S Removal by Activated Carbons. Journal of Colloid and Interface Science 216, 360-369 (1999).

Canadian Office Action dated Jul. 11, 2012, from corresponding Canadian Application No. 2,621,621.

Canadian Office Action dated May 31, 2013, from corresponding Canadian Application No. 2,621,621.

Canadian Office Action dated Mar. 14, 2014, from corresponding Canadian Application No. 2,621,621.

European Search Report Dated May 24, 2013, from corresponding European Application No. 06814311.4.

Israeli Office Action dated Apr. 11, 2013, from corresponding Israeli Application No. 189959.

Indian First Examination Report dated Jan. 18, 2013, from corresponding Indian Application No. 1016/KOLNP/2008.

Notice of Reasons for Rejection dated Jun. 19, 2012, from corresponding Japanese Application No. 2008-530212.

Notice of Reasons for Rejection dated Apr. 1, 2014, from corresponding Japanese Application No. 2012-276759.

Korean Office Action dated Sep. 17, 2013, from corresponding Chinese Application No. 10-2013-7019426.

Korean Notice of Allowance for Patent dated Feb. 28, 2014, which issued during prosecution of Korean Application No. 10-2008-7008475.

Korean Notice of Allowance for Patent dated Apr. 23, 2014, which issued during prosecution of Korean Application No. 10-2013-7019426.

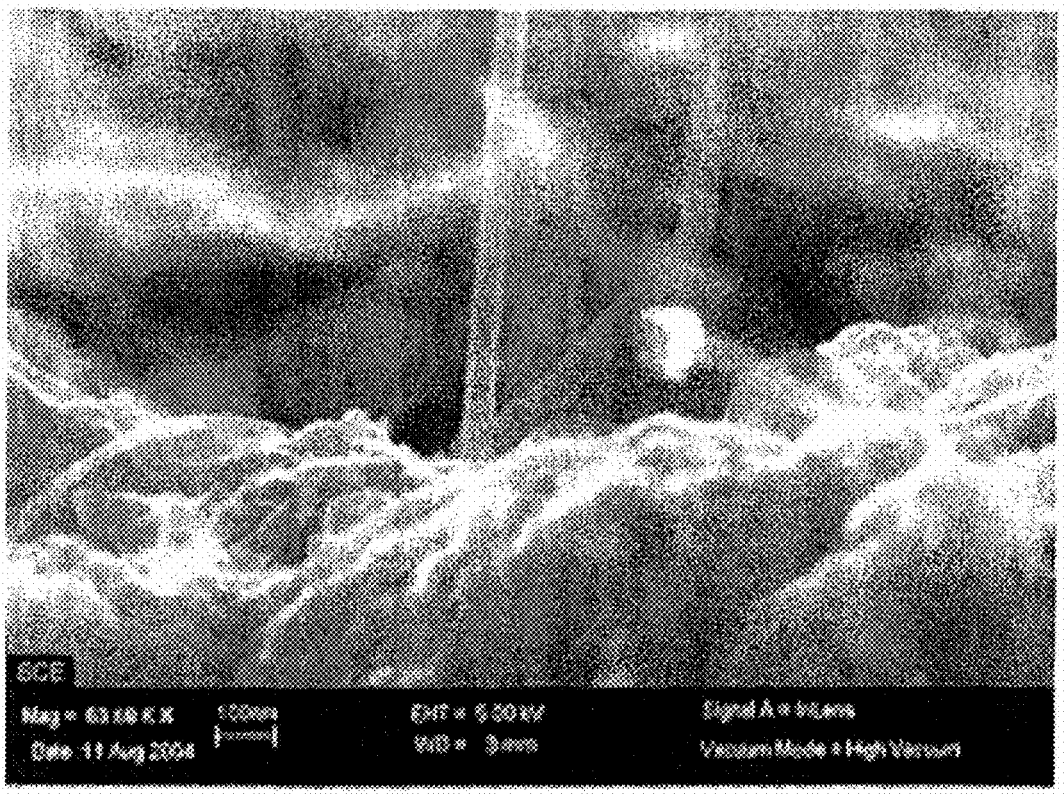
FIGURE 1 – PRIOR ART

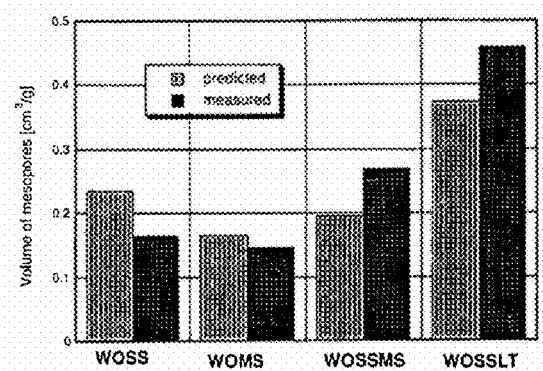
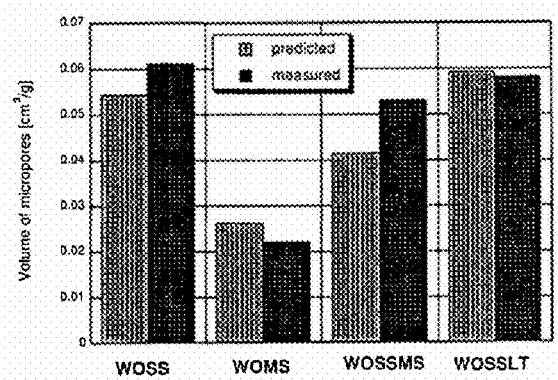
FIGURE 2A                    FIGURE 2B

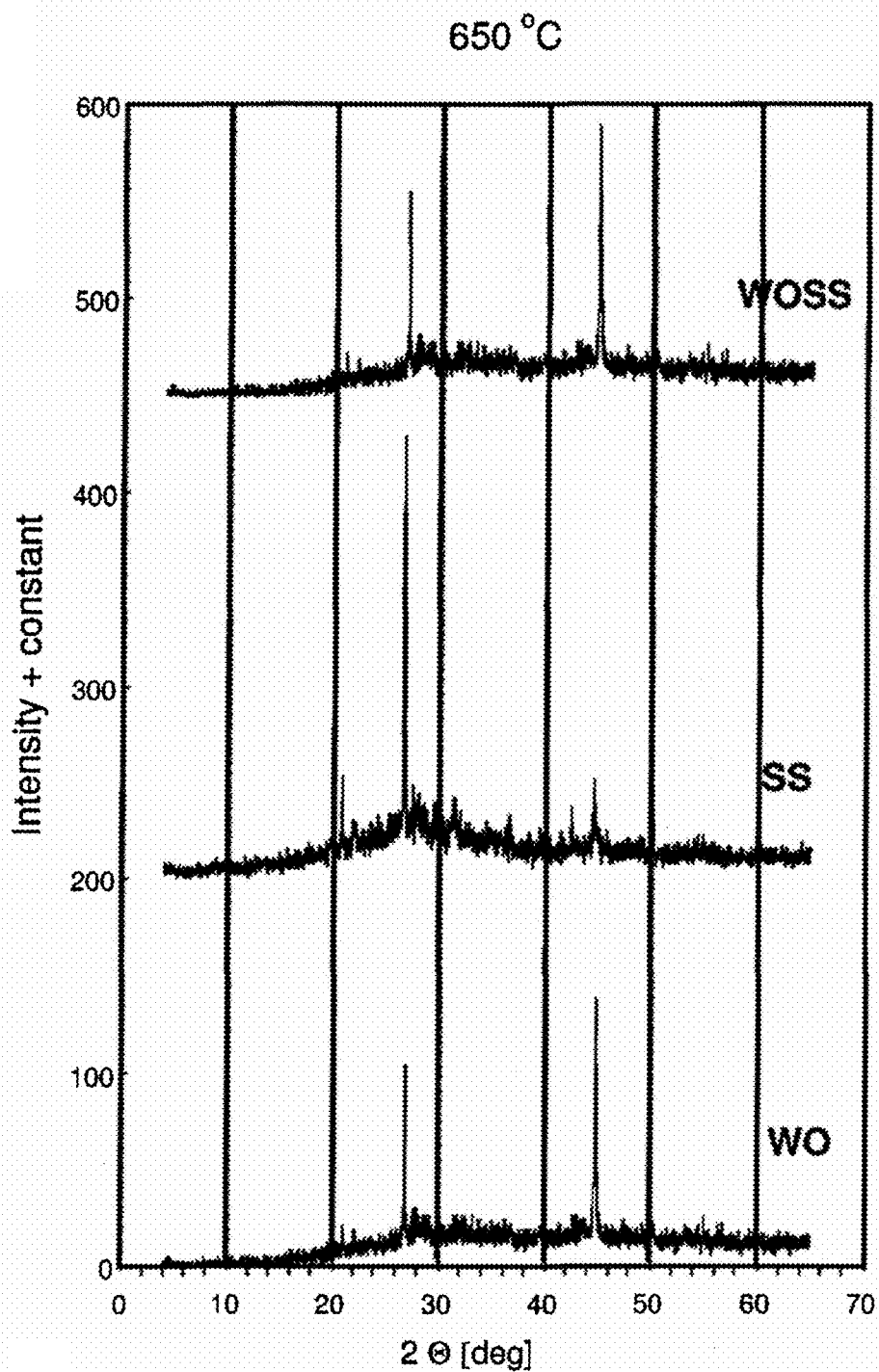

US 8,937,032 B2

CATALYTIC ADSORBENTS OBTAINED FROM MUNICIPAL SLUDGES, INDUSTRIAL SLUDGES, COMPOST AND TOBACCO WASTE AND A ROTARY DRYING PROCESS FOR THEIR PRODUCTION

CROSS-REFERENCE TO RELATED APPLICATIONS

The present application is a continuation of U.S. patent application Ser. No. 12/136,527 filed Jun. 10, 2008, which is a continuation-in-part of U.S. patent application Ser. No. 11/530,298 filed Sep. 8, 2006, which claims priority to U.S. Provisional Patent Application Nos. 60/715,788 filed Sep. 8, 2005; 60/782,593 filed Mar. 14, 2006; and 60/801,545 filed May 17, 2006. The entireties of all the applications are incorporated herein by reference.

BACKGROUND OF THE INVENTION

1. Field of the Invention

The invention relates to the formation of catalytic adsorbents formed from the pyrolysis of different types of sludges alone or in combination with composting materials. The sludges include municipal, industrial, waste oil and metal based sludges. The composting materials can include tobacco waste.

2. Discussion of the Related Art

Growing concerns about the environment has resulted in the development of new environmentally friendly technologies, new materials, and new ways to reduce and minimize wastes. One of the wastes produced by contemporary society in abundant quantity is municipal sewage sludge, often referred to as biosolids. Biosolids are a mixture of exhausted biomass generated in the aerobic and anaerobic digestion of the organic constituents of municipal sewage along with inorganic materials such as sand and metal oxides. Other sludges include wastes from such industry as shipyards, foundry, or paper mills. It is estimated that about 10 million dry tons of sewage sludge is produced in the United States. Moreover, Sweden alone contributes 220,000 dry tons of sludge to the 8-10 million tons of dry sludge produced by European Union.

Various methods have been used to dispose of or utilize municipal sewage sludge, including incineration, landfilling, road surfacing, conversion to fertilizer, compression into building blocks, and carbonization. Since 1976, several patents have been issued on carbonization of sewage sludge and various applications of the final materials. Carbonization of sludge in the presence of chemical activating agents such as zinc chloride and sulfuric acid produces new sorbents, with patented applications in processes such as removal of organics in the final stages of water cleaning and removal of chlorinated organics. Industrial sludges after dewatering processes/drying are ether used as landfills or disposed mainly as hazardous wastes.

Carbonization of sludge to remove pollutants either from gas of liquid phase, is based on the fact that typically activated carbons are chosen. This is owing to their large surface area and high volume of pores. Often, these characteristics of activated carbons are not potent enough to retain certain molecules, especially small ones, for which the dispersive interactions with the carbon surface are rather weak. In such cases, the carbon surface has to be modified to impose the specific interactions. These interactions include hydrogen bonding, complexation, acid/base reactions or redox processes. Fortunately, in the case of carbons, various technologies leading to modified surfaces exist and are relatively easy to achieve. Examples are oxidations with various oxidants such as strong acids, ozone, or air, impregnation with catalytic metals or reducing/oxidizing compounds, heat treatment in the presence of heteroatom sources such as chlorine or nitrogen compounds, and others.

As a result of the treatments mentioned above, new functional groups/chemical species are introduced to the surface. They impose the specific and/or chemical interactions with the species to be removed. To have the removal process efficient, the chemical state of these species and their dispersion on the surface are important issues. Another important challenge is preservation of carbon porosity which is a crucial asset for the retention/storage of pollutants. Thus, the surface modifications can be done in such a way in which a minimal decrease in the surface area/pore occur.

Taking into account the above requirements, in some cases modifications of a carbon surface, besides being a challenge, can also be associated with high expenses, especially when noble or catalytic metals are involved. Industrial sludges, as those coming from shipyards or other heavy metal industries, are rich in catalytic transition metals. By pyrolysis of these materials, not only the volume of waste is reduced but those environmentally detrimental wastes can be recycled and converted into valuable products. These products, when used, can be safely disposed since the leaching of materials is significantly reduced by mineralization of those metals via high temperature solid state reactions.

The process of carbonization of sewage sludges has been studied in detail previously and it is described in the literature. Materials obtained as a result of the treatment have surface areas between 100 and 500 $m^2/g$. Their performance as adsorbents of hydrogen sulfides, sulfur dioxide, basic or acidic dyes, phenol or mercury has been reported as comparable or better that that of activated carbons. In many process the excellent sorption ability of these materials is linked to the catalytic action of metals present in various forms in the final products. Their chemical forms along with the location on the surface were reported as important factors governing the pollutant removal capacities. In some case the wastes were mingled and, owing to the synergy between the components, more efficient adsorbents were obtained.

Adsorbents obtained by pyrolysis of sludge can be considered as complex pseudocomposite materials. However, the process of carbonization of biosolids has been studied in detail previously and it is described in the literature. It has been recently shown that by simple pyrolysis of municipal sewage sludge derived fertilizer, Terrene®, exceptionally good adsorbents for removal of sulfur containing gases can be obtained. The removal capacity is twice that of coconut shell based activated carbon. Although, it was attributed to the specific combination of inorganic oxides of such metals as iron, copper, zinc or calcium. The predominant influence of inorganic phase or combination of oxides, which are also quite commonly used as catalysts for hydrogen sulfide oxidation or sulfur dioxide adsorption, was ruled out on the bases of the performance of a pure inorganic phase in the removal of sulfur containing gases. The capacity of pure inorganic phase heated at 950° C. was negligible. The data also showed that the oxidation of hydrogen sulfide occurs until all micropores (mainly about 6 Å in size), likely within carbonaceous deposit or on the carbon/oxide interface, are filled with the reaction products. The form of that carbonaceous deposit is important and that deposit may play a role in adsorption capacity.

The products of oxidation immobilized on the surface are stored there. Table 1 shows the capacity of sewage sludge derived materials as adsorbents of sulfur containing gases. For removal of a toxic gas containing reduced sulfur the capacity is much greater than that of activated carbons. It happens in spite of the fact that the carbon content is small (about 20%) and pore volume much smaller than that of carbons.

TABLE 1

$H_2S$ and $SO_2$ breakthrough capacities for sludge derived adsorbents (SC series) and activated carbon (S208). The number after SC refers to the temperature of heat treatment in Centigrade.

| Sample | $H_2S$ breakthrough capacity [mg/g] | $SO_2$ breakthrough capacity [mg/g] |
|---|---|---|
| SC-400 | 8.2 | 5.1 |
| SC-600 | 14.9 | 9.5 |
| SC-800 | 23.6 | 22.2 |
| SC-950 | 82.6 | 29.8 |
| S208 | 48.8 | 48.2 |

Since pore volume seems to be a limiting factor for the capacity of sewage sludge derived materials, an increase in the content of carbonaceous deposit and pore volume with maintaining the desired content of a catalytically active phase seems to be the desired direction of feature research. Resent studies showed that the pore volume active in the removal of such compounds as hydrogen sulfide does not need to be in pores similar in size to adsorbent molecule. Since the catalytic oxidation is the predominant mechanism of adsorption, the larger pores, (meso- and macropores) where the product of oxidation is stored were found to be beneficial.

Another important factor is the chemistry of a catalytic phase, its dispersion, location on the surface, compatibility with the carbon phase and the effects of both phases on the removal process (adsorption/catalytic oxidation/storage). It was found that excellent capacity of an expensive desulfurization catalyst, US Filter carbon Midas®, is linked to the presence of calcium and magnesium oxides dispersed within the microporous activated carbon. On this catalyst, hydrogen sulfide is oxidized on basic centers of alkali earth metal oxides and sulfur is formed. The fact that this carbon is able retain up to 60 wt % sulfur is linked to a limited reactivity of MgO and CaO. On their surface, due to the basic pH and the presence of moisture, sulfur is formed and owing to the close proximity of the carbon phase, that sulfur migrates to the high-energy adsorption centers, small pores. In this way the catalytic centers are renewed and the adsorbents works until all small pores are filled by sulfur.

Sewage sludge based materials were also found as efficient adsorbents for removal of mercury from waste water and copper. Other common industrial pollutants which can be efficiently removed using those materials are basic and acidic dyes. In the case of these adsorbates the high capacity is linked to surface chemical nature (acidic and basic sites) and relatively large pores which are similar in size to the molecules of organic dyes.

At high temperature, the organic matter vaporizes, dehydrogenation occurs and carbon can be deposited back on the surface of an inorganic support as carbon nanotubes of filaments. This may happen due to the presence of highly dispersed catalytically active metals. Since this process resembles the chemical vapor deposition (CVD), it is referred to as the self-imposed chemical vapor deposition (SICVD). The process of carbon nanotube growth on the catalysts containing nickel or cobalt is well-known and described in the literature. The nanotubes and carbon filaments grow on metal "seeds" and their effective size depends on the sizes of the seeds. Introduction of more carbon phase can increase the porosity leading to more space for storing of oxidation products and also can lead to the formation of greater quantity of novel carbon entities in the process of CVD. FIG. 1 shows an SEM image of carbon nanotubes grown on the surface of sewage sludge-derived materials.

The carbon and nitrogen content of the sludge plays a role in the formation and properties of the adsorbent. While municipal sewage sludge is a promising material to use as a base with other waste sludges, other carbon or nitrogen based wastes can also be used. Besides formation of new carbon entities in the presence of catalytic metals as a result of heat treatment the new spinel-like/mineral like active components can be formed. Recently, for some sewage sludges containing iron and calcium the catalytically important entities were identified as dicalcium ferrite ($Ca_2Fe_2O_5$).

SUMMARY OF THE INVENTION

Definitions

The term "adsorption" refers to the phenomenon wherein the surface of a solid accumulates a concentration of molecules from its gaseous or liquid environment.

The term "adsorbent" refers to a material that is able to adsorb gases or vapors under certain conditions.

The term "pyrolysis" refers to heat treatment (e.g., at a temperature over 400° C.) in inert atmosphere of materials having organic origin.

The term "chemical activation" refers to the treatment of organic precursors with certain chemicals during pyrolysis.

The term "activated carbon" refers to a carbonaceous material obtained by pyrolysis of organic precursors (e.g., coal, wood, peat, etc.) at elevated temperatures followed by their activation using various physical or chemical agents (e.g., at a temperature between about 600° C. and 1,000° C.).

The term "caustic-impregnated carbon" refers to activated carbons impregnated with KOH and NaOH in order to increase their pH and adsorption capacity for acidic gases.

The term "breakthrough capacity" refers to the amount of substance adsorbed on the sorbent surface until the substance is detected in effluent air at a certain concentration level.

The term "acidic gases" refers to gases that are able to transform into acids, or gases that are able to interact as acid (e.g., electron acceptors).

The term "specific surface area" refers to the surface area of adsorbent considered as an area where adsorption of various molecules could occur.

The term "pore volume" refers to the volume of pores in an adsorbent calculated as available for nitrogen molecules at its boiling point.

The term "oxidation" refers to the change in the chemical stage of a substance associated with an electron loss. The charge on the species becomes more positive.

The term "residence time" refers to the average time taken by reagent molecules to pass through a reactor.

The term "compost material" refers to the individual materials that are composted.

The term "compost" can refer to either a mixture that consists largely of decayed organic matter or the act of converting compost materials into compost.

Waste oil sludge, waste metal sludge (both from a shipyard, but the origin of the sludges can be from any heavy industry facilities where transition metals such as iron, zinc, copper, nickel, chromium are used) were mixed with municipal sewage sludge at different proportions then pyrolyzed in the nitrogen atmosphere at 650° C. and 950° C. for two different time periods (half an hour and an hour). Additional samples were pyrolyzed in the nitrogen atmosphere at a low temperature, e.g., about 600° C., 625° C., 650° C., 675° C., or 700° C. or less, and at a high temperature, e.g., about 900° C., 925° C., 950° C., or 975° C., 1,000° C., 1,100° C. or higher. As used herein, the term "industrial sludge" includes any sludge that is not domestic wastewater sludge. This includes wastewater sludge from manufacturing or processing of raw materials, intermediate products, final products or other activities that include pollutants from non-domestic wastewater sources. "Municipal" or "domestic" wastewater sludge can be generated at plants servicing the general population and may conform to the "10 State Standards."

Combinations of compost/compost materials and municipal/industrial sludge, along with pyrolyzation in a nitrogen atmosphere, can lead to formation of new adsorbents. The new adsorbents can consist of an inorganic phase (70-95% and 80-98%) and a carbonaceous phase (5-30% and 10-30%). The inorganic phase can contain highly dispersed catalytic metals such as iron, nickel, copper, zinc, chromium, and calcium and magnesium oxides, alumina, silica, etc.

As a result of synergy, a ceramics/mineral-like phase is formed. This phase reacts with nitrogen gas when exposed to elevated temperatures. The specific surface areas are about 10 $m^2/g$ to about 200 $m^2/g$. For example, the specific surface areas may be about 10 $m^2/g$, 20 $m^2/g$, 30 $m^2/g$, 40 $m^2/g$, 50 $m^2/g$, 60 $m^2/g$, 70 $m^2/g$, 80 $m^2/g$, 90 $m^2/g$, 100 $m^2/g$, 110 $m^2/g$, 120 $m^2/g$, 130 $m^2/g$, 140 $m^2/g$, 150 $m^2/g$, 160 $m^2/g$, 170 $m^2/g$, 180 $m^2/g$, 190 $m^2/g$, 200 $m^2/g$, or greater. The specific pore volumes are about 0.002 $cm^3/g$ to about 0.074 $m^2/g$. For example, the specific pore volumes are about 0.002 $cm^3/g$, 0.005 $m^2/g$, 0.015 $m^2/g$, 0.025 $m^2/g$, 0.035 $m^2/g$, 0.045 $m^2/g$, 0.055 $m^2/g$, 0.065 $m^2/g$, 0.074 $m^2/g$, or greater. An important aspect of the texture is a significant volume of mesopores reaching about 0.8 $cm^3/g$. All materials have basic pH, e.g., a pH over 9. They are capable of adsorbing up to about 10, 15, 20, 25, or 30 wt % of hydrogen sulfide, mainly as elemental sulfur.

The discovered solid state reactions form ceramics/mineral like crystallographic phases. Spinel-like compounds can form when municipal/industrial sludge is pyrolized at 950° C., such as wurtzite (ZnS), ferroan ($Ca_2(Mg, Fe)_5(SiAl)_8O_{22}(OH)_2$), chalcocite ($Cu_{1.96}S$), spinel ($MgAl_2O_4$), and feroxyhite (FeO(OH)) were found. In waste oil-based materials besides metallic iron, bornite ($Cu_5FeS_4$), hibonite ($CaAl_{12}O_{19}$), zincite (ZnO), ankerite ($Ca(Fe, Mg)(CO_3)_2$) are present. In metal sludge based adsorbent aluminum, metallic iron, copper, zinc, pyrope ($Mg_3Al_2(SiO_4)_3$), perrohotite ($Fe_7S_8$), Chalocopyrite ($CuFeS_2$), Triolite (FeS) and Fersilicite, (FeSi) exist. Mixing industrial sludges with compost or compost materials can result in synergy enhancing the catalytic properties which can be linked to formation of new entities such as sapphirine ($Mg_{3.5}Al_9Si_{1.5}O_{20}$), maghemite ($Fe_2O_3$), cohenite ($Fe_3C$), lawsonite ($CaAl_2Si_2O_7(OH)2H_2O$), smithsonite ($ZnCO_3$), sphalerite (ZnS), and hematite ($Fe_2O_3$).

The new entities can be formed during pyrolysis that react with nitrogen gas when exposed to elevated temperatures (200-600° C.). This can result in an increase in weight between 0-3%. Some of these entities can be nitrides. The specific surface areas and total pore volumes of the adsorbents are between 10-210 $m^2/g$ and 0.15-0.85 $cm^3/g$, respectively. An important aspect of the texture can be a significant volume of mesopores reaching 0.8 $cm^3/g$ (between 0.14-0.77 $cm^3/g$). All materials have basic pH between 7-12. They are capable to adsorb up to 30 wt % of hydrogen sulfide mainly as elemental sulfur. Exposure to hydrogen sulfide and deposition of sulfur results in an increase in the volume of mesopores up to 25% as a result of formation of new pore space in-between deposited sulfur in large pores. The important components besides alkaline earth metals and transition metals are iron oxides and hydroxyoxides (but not only) since they contribute to oxidation of hydrogen sulfide to elemental sulfur. The developed materials are also good adsorbents of cationic or ionic dyes and heavy metals (up to 80 mg/g copper and up to 130 mg/g dyes). The spinel-like phase formed during pyrolysis contributes to cation exchange, complexations and precipitation reactions. During these reactions only small quantity of calcium and zinc is released to the solution as a result of a cation exchange process.

The present invention uses the combination of compost and/or compost materials and municipal and/or industrial waste sludge to form adsorbents. Successful results used fertilizer and municipal sludge to create adsorbents, because they contain, in part, large amounts of carbon and nitrogen. Other wastes are available that are rich in carbon and nitrogen to use as a base material. One waste is compost and compost materials. Compost materials can be divided into two categories, "brown"—high in carbon, and "green"—high in nitrogen.

Brown compost materials can be fall leaves, spent plants, straw and hay, pine needles, small twigs and wood chips, sawdust and woodshavings, shredded newspaper, egg shells, corncobs, bread and grains, wood ashes, old potting soil, food-soiled paper towels and napkins, dried flowers, brewery waste, hops, and pomace, food-soiled cardboard (recycle if clean, but compost if dirty), stale flour, cereal, spices, beans, nutshells, meat and fish scraps.

Green compost materials can be fruit and vegetable scraps, coffee grounds and filters, tea bags, fresh leaves, green plants, prunings and hedge trimmings, grass clippings, weeds, flower bouquets, seaweed, feathers, horse manure, manure and bedding from small pets such as hamsters and rabbits, cornstarch and other organic packing materials, and spoiled juice.

Additionally, over 70,000 tons of tobacco waste is generated every year during the production of cigarettes. In India alone, over 20 years ago, almost 100,000 tons of tobacco waste was generated, and more is generated every year. Tobacco waste is currently used as a compost material and fertilizer. Tobacco waste spans the entire cigarette making process from growing and harvesting to final production. The types of wastes generated during pre- and post-harvest practice of tobacco include suckers, stems, mid ribs, leaf waste and dust. For example, green trimmings are generated as the either the stalks and/or leaves are harvested and separated from their stalks for curing. After curing, certain varieties of tobacco are threshed (by separating the midrib of the leaf) generating particle waste and stalks can also be removed at this stage, depending on the type of tobacco. Stems are removed from the cured and aged tobacco and the leaves and stems are chopped and blended. Tobacco dust can be formed during the chopping and blending stages. Further dust can be generated as the chopped tobacco is formed into tobacco rods and finally wrapped into paper. Some chemical characteristics of tobacco waste are listed in Table 2.

TABLE 2

Some Chemical Characteristics of Tobacco

| O.M. % | pH (1/5) | EC(1/5) (μm/cm) | Ca (μg/g) | Mg (μg/g) | N (%) | K (%) | P (μg/g) | Na (μg/g) | Fe (μg/g) | Cu (μg/g) | Zn (μg/g) | Mn (μg/g) |
|---|---|---|---|---|---|---|---|---|---|---|---|---|
| 41 | 5.80 | 10700 | 8050 | 9400 | 2.35 | 1.95 | 973 | 572 | 3150 | 84 | 90 | 279 |

The use of compost and/or compost material was determined from studies using combinations of municipal sewage sludge and industrial sludge and municipal sludge and waste paper. The waste paper is used for its high carbon content. The paper was ground fine and added to the sludge. Compost materials can be ground like the paper and tobacco dust is in particulate/powder form. Sawdust is another compost material that is already in particulate/powder form. Sawdust is a brown compost material that is high in carbon. Wood char/ash can also be used based on its carbon content.

The invention can combine the compost/compost materials with industrial sludge or with a mixture of municipal and industrial sludge. The compost/compost materials can be wetted as it is mixed, or may contain enough natural moisture to be mixed directly. The ratios of compost to sludge can range between 25% and 75%. Additionally, calcium hydroxide may be added to help influence the dissociation of hydrogen sulfide.

BRIEF DESCRIPTION OF THE FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a SEM image of the carbon nanotubes on the surface of sewage sludge-derived adsorbent of the prior art;

FIGS. 2A and 2B are graphs depicting the predicted and measured volume of meso- and micro-pores, respectively, for the adsorbents derived from mixtures of industrial and municipal sludges;

FIGS. 7A and 7B illustrate X-ray diffraction patterns at 650° C. and 950° C., respectively;

DETAILED DESCRIPTION OF THE INVENTION

Industrial sludges such as waste oil sludge and metal sludge can be utilized using pyrolysis to produce new catalytic adsorbents. An important result of mixing is an enhancement in the properties of the above-mentioned sewage sludge-based adsorbents. Although only waste oil sludge can lead to adsorbents with an exceptional ability for desulfurization with 30 wt % removal capacity, the presence of sewage sludge is an economically feasible method of utilizing this abundant material.

Figure 3:
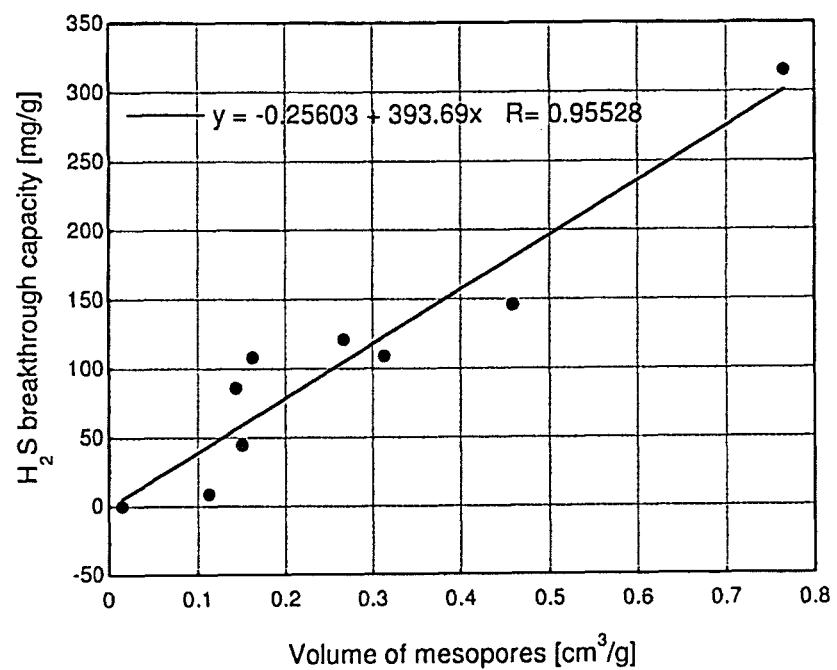
FIG. 3 is a graph depicting dependence of $H_2S$ removal capacity on the volume of mesopores in industrial and municipal sludge-derived adsorbents.

Mixing the sludge and their pyrolysis resulted in the enhanced properties compared to the physical mixture of pyrolized single components. FIGS. 2A and 2B show the comparison of the volumes of pores measured and predicted for the physical mixture of waste oil sludge (WO), sewage sludge (SS) and metal sludge (MS). The generally observed trend indicates that mixing sludges results in the development of an additional pore volume. That pore volume, especially mesopores, was identified as one of the factors governing the adsorption capacity. FIG. 3 shows the dependence of the $H_2S$ removal capacity on the volume of mesopores. Since the analysis of materials pH and thermodesorption indicated elemental sulfur as an oxidation product, only mesopores can store such amount of sulfur as found from $H_2S$ breakthrough capacity tests (up to 30 wt %).

Figure 4:
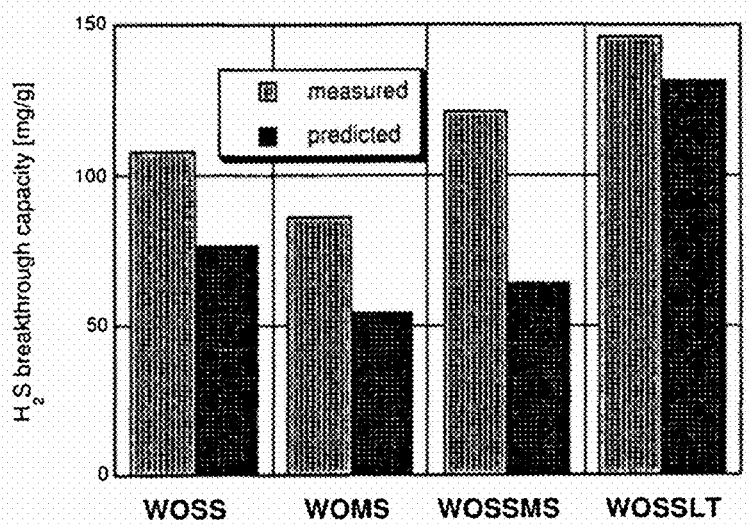
FIG. 4 is a graph depicting a comparison of the predicted and measured $H_2S$ breakthrough capacity for sewage and industrial sludge-based adsorbents.

Besides porosity, surface chemistry is also altered during pyrolysis of the sludge mixture as compared to the single components. FIG. 4 shows the comparison of the measured and predicted capacity based on the performance of the individual components assuming the physical mixture. The huge enhancement found, reaching 100%, is the result of changes in the composition and the surface distribution of an inorganic phase. The sludges studied contain iron, copper, nickel, zinc, calcium, chromium and other metals in significant quantities. Their high temperature reaction in the presence of carbon phase can lead to unique spinel/mineral-like components active in the oxidation reactions.

Figure 5:
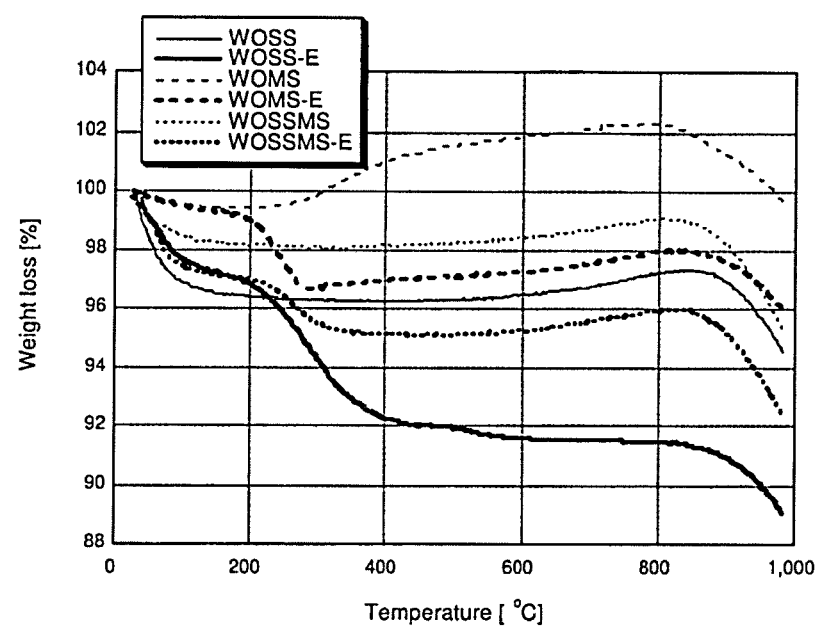
FIG. 5 is a graph depicting DTG curves in nitrogen for selected adsorbants for initial and $H_2S$ exposed samples (E)

FIG. 5 illustrates an increase in the mass of the sample obtained by high temperature pyrolysis. FIG. 5 shows DTG curves in nitrogen for selected adsorbants for initial and $H_2S$ exposed samples (E). The phenomenon was not observed for the samples pyrolyzed at low temperature. While not intending to be bound by theory, the increase may be a result of nitride formation. It was found the certain ceramic materials, when exposed to nitrogen in the presence of char, are able to form nitrides. Formation of these ceramics can be crucial for catalytic performance.

Figure 6:
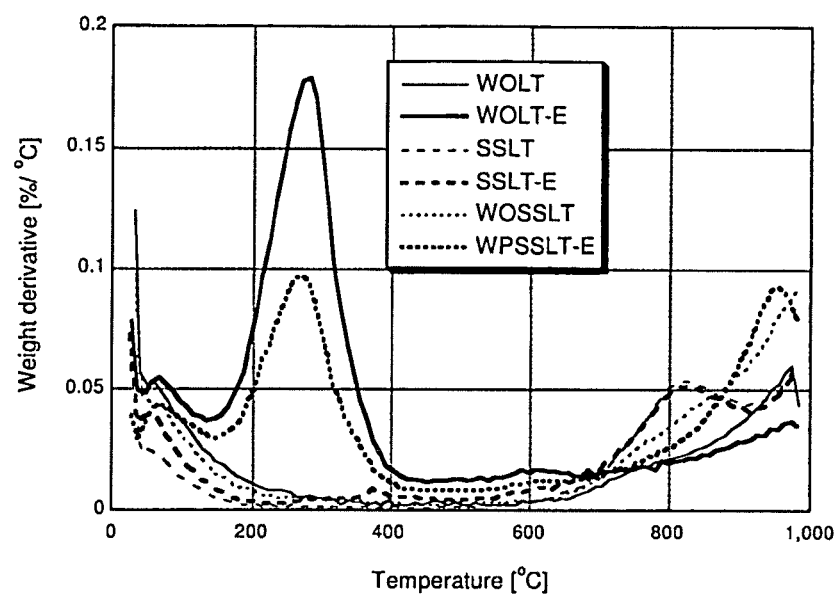
FIG. 6 is a graph depicting DTG curves in nitrogen for selected adsorbants for initial and $H_2S$ exposed samples (E)

Although the best adsorbents are obtained at about 650° C., the synergy is the most predominant at about 950° C. when a mineral like/ceramic phase is formed. Moreover, an increase in the mass of samples under nitrogen at about 600° C. indicates that ceramic components of adsorbents form nitrides in the presence of carbon. FIG. 6 illustrates DTG curves in nitrogen for selected adsorbants for initial and $H_2S$ exposed samples (E). Those ceramics must be active in the process of $H_2S$ adsorbents since an increase in mass significantly decreased after exposure to hydrogen sulfide and water. The surface of adsorbents treated at about 950° C. has very low affinity to retain water (hydrophobic). Temperature has also an effect on the density of the final products, which varies from about 0.25 at 650° C. to about 0.50 at 950° C.

Figure 7B:
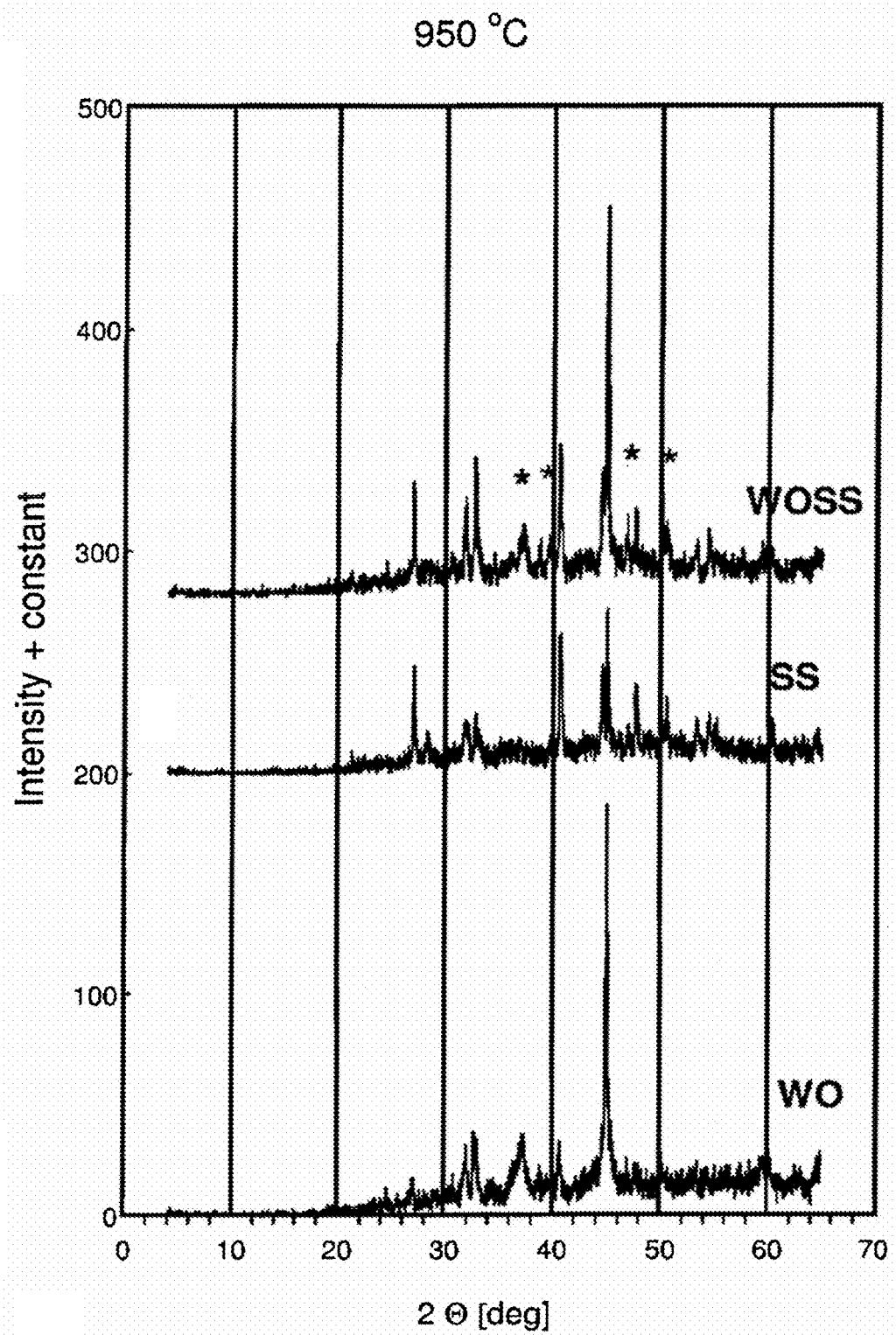

As mentioned above, unique compounds exist as crystallographic phases and they consist of metals such as calcium, magnesium, alumina, copper, iron, zinc and nonmetals such as oxygen sulfur, carbon and silica. The level of mineralization increases with an increase in the pyrolysis temperature and time. Higher temperature results in formation of two component metal-nonmetal crystallographic compounds with metals at low oxidation states. FIGS. 7A and 7B show the changes in the X-ray diffraction pattern for samples obtained at different temperatures. FIG. 7A illustrates the X-ray diffraction pattern at 650° C. and FIG. 7B is at 950° C.

Advantages of the present invention include the fact that the sorbents obtained from industrial sludge have five times higher capacity for hydrogen sulfide removal than unmodified carbons. Their capacity is comparable to that of caustics impregnated carbon used worldwide as hydrogen sulfide adsorbents in sewage treatment plants. Furthermore, the kinetics of the removal process are very fast and no heat is released. Moreover, during adsorption, $H_2S$ reacts with inorganic matter and is oxidized to elemental sulfur. The product is environmentally inert. Importantly, the pH of the spent material is basic, so it can be safely discarded. Only small amounts of $SO_2$ are released. Another advantage of the invention is that, since the sorbents are obtained from waste sludge, the significant amount of industrial and municipal waste can be recycled and reused in sewage treatment plants. The sorbents can be also used in desulfurization of gaseous fuels (for fuel cell applications) and in hydrothermal vents. The sorbents find another environmental application in removal of mercury from waste water. Furthermore, there is the possibility of regeneration of spent materials using heating to about 300° C. to remove elemental sulfur.

Example 1

The homogeneous mixtures of waste sludges were prepared as listed in Table 3 and dried at 120° C. The dried samples were then crushed and pyrolyzed in a horizontal furnace at 950° C. for 30 min. The temperature ramp was 10 degrees/minute. An inert atmosphere was provided by 10 ml/min. flow of nitrogen. The yields, ash content and densities of materials are listed in Table 3.

TABLE 3

Adsorbents' composition, yields, ash content and densities.

| Sample | Wet composition | Solid content | Dry composition | Yield (dry mass) | Ash content* | γ [g/cm³] |
|---|---|---|---|---|---|---|
| WO | WO: 100% | 23.6 | WO: 100% | 29 | 92 | 0.48 |
| SS | SS: 100% | 24.6 | SS: 100% | 45 | 80 | 0.46 |
| MS | MS: 100% | 23.4 | MS: 100% | 47 | @ | 0.85 |
| WOSS | WO: 50% SS: 50% | — | WO: 49% SS: 51% | 34 | @ | 0.46 |
| WOMS | WO: 50% MS: 50% | — | WO: 50% MS: 50% | 50 | @ | 0.47 |
| WOSSMS | WO: 40% SS: 40% MS 10% | — | WO: 46% SS: 31% MS 23% | 41 | @ | 0.46 |

*Determined as mass left at 950° C. after in TA run in air.
@—not determined due to reaction with air during burning The performance of materials as sorbents for hydrogen sulfide was evaluated using lab developed breakthrough tests. Adsorbent samples were packed into a column (length 60 mm, diameter 9 mm, bed volume 6 cm³) and pre-humidified with moist air (relative humidity 80% at 25° C.) for an hour. The amount of adsorbed water was estimated from the increase in the sample weight after pre-humidification (the sorbents were removed from the column and weighted). Moist air containing 0.3% (3,000 ppm) $H_2S$ was then passed through the column of adsorbent at 1.4 L/min. The breakthrough of $H_2S$ was monitored using an Interscan LD-17 $H_2S$ continuous monitor system interfaced with a computer data acquisition program. The test was stopped at the breakthrough concentration of 350 ppm. The adsorption capacities of each sorbent in terms of grams of $H_2S$ per gram of material were calculated by integration of the area above the breakthrough curves, and from the $H_2S$ concentration in the inlet gas, flow rate, breakthrough time, and mass of sorbent. The obtained results are collected in Table 4.

TABLE 4

$H_2S$ breakthrough capacities, adsorption of water and surface pH before and after $H_2S$ adsorption (E—after exposure to $H_2S$).

| Sample | Brth capacity [mg/g] | Bth capacity [mg/cm³] | Water adsorbed [mg/g] | pH | pHE |
|---|---|---|---|---|---|
| WO | 109 | 52 | 0 | 9.9 | 9.4 |
| SS | 45 | 21 | 26 | 10.9 | 10.0 |
| MS | 2.8 | 2.4 | 0 | 10.67 | 10.04 |
| WOSS | 108 | 50 | 11 | 10.8 | 9.1 |
| WOMS | 86 | 40 | 3 | 9.9 | 8.8 |
| WOSSMS | 121 | 56 | 4 | 10.5 | 9.4 |

Figure 8:
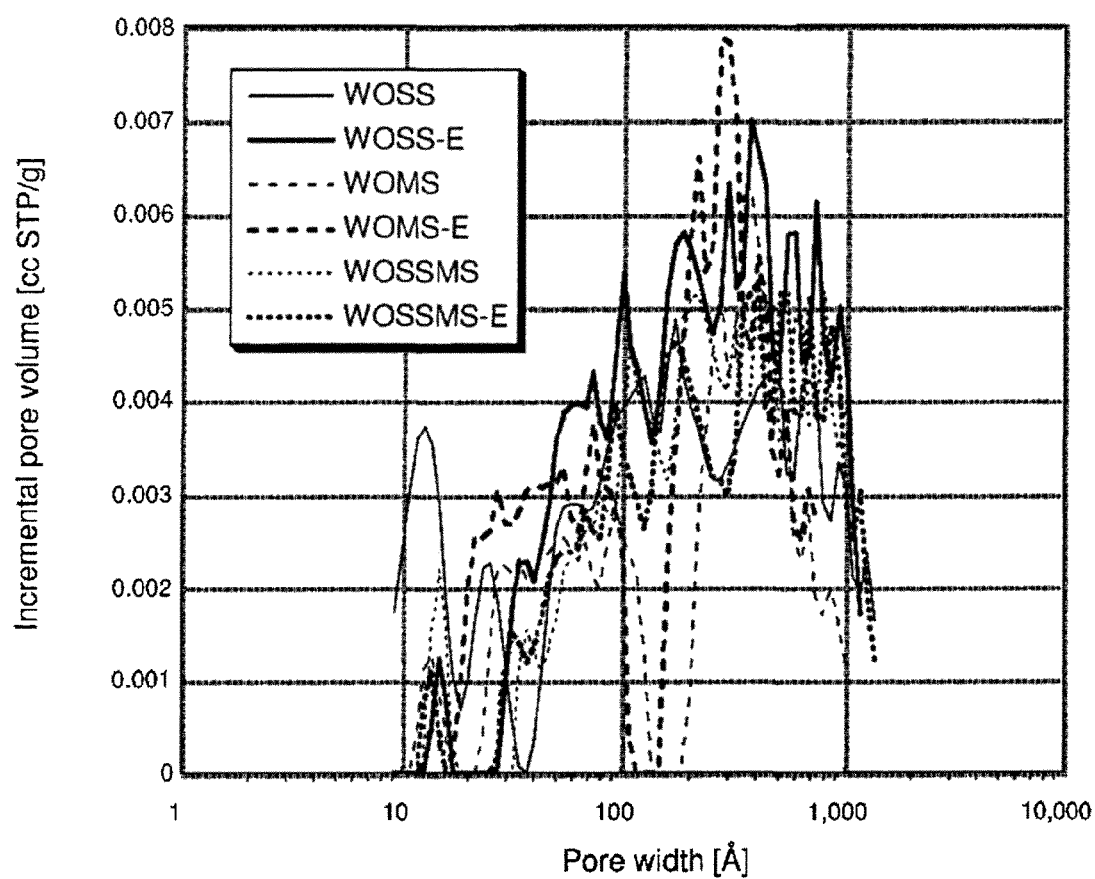
FIG. 8 illustrates changes in pore size distribution after $H_2S$ adsorption.

Characterization of pore sizes and adsorption capacity of materials prepared was accomplished using physical sorption measurement. The equilibrium adsorption isotherms of $N_2$ were measured by volumetric techniques. From the isotherms, the pore size distribution (PSD) was evaluated using the Density Functional Theory (DFT). The surface area was calculated using BET approach and micropore volumes using Dubinin-Radushkevich equation (DR). The results are presented in Table 5. The symbol "Δ" represents the difference in the specific pore volume before and after deposition of sulfur. For all samples but MS an increase in the volume of mesopores was found as a result of deposition of elemental sulfur and formation of new pores within that deposit. The examples of PSDs are presented in FIG. 8.

TABLE 5

Parameters of porous structure (WO—waste oil origin; SS—sewage sludge origin; MS—metal sludge origin; E—after exposure to $H_2S$).

| Sample | $S_{BET}$ [m²/g] | $V_{mic}$ [cm³/g] | $\Delta V_{mic}$ [cm³/g] | $V_{mes}$ [cm³/g] | $\Delta V_{mes}$ [cm³/g] | $V_t$ [cm³/g] | $V_{mic}/V_t$ |
|---|---|---|---|---|---|---|---|
| WO | 132 | 0.050 | | 0.314 | | 0.364 | 14 |
| WO-E | 96 | 0.034 | −0.16 | 0.355 | 0.041 | 0.389 | 8 |
| SS | 141 | 0.058 | | 0.151 | | 0.209 | 28 |
| SS-E | 121 | 0.032 | −0.26 | 0.190 | 0.039 | 0.222 | 17 |
| MS | 10 | 0.002 | | 0.015 | | 0.017 | 12 |
| MS-E | 4 | 0.001 | −0.01 | 0.005 | −0.010 | 0.006 | 17 |
| WOSS | 150 | 0.061 | | 0.163 | | 0.224 | 41 |
| WOSS-E | 89 | 0.030 | −0.31 | 0.258 | 0.096 | 0.288 | 31 |
| WOMS | 70 | 0.022 | | 0.144 | | 0.166 | 13 |
| WOMS-E | 60 | 0.017 | −0.05 | 0.154 | 0.010 | 0.171 | 11 |
| WOSSMS | 144 | 0.053 | | 0.267 | | 0.320 | 20 |
| WOSSMS-E | 59 | 0.022 | −0.21 | 0.183 | −0.085 | 0.205 | 11 |

Figure 9:
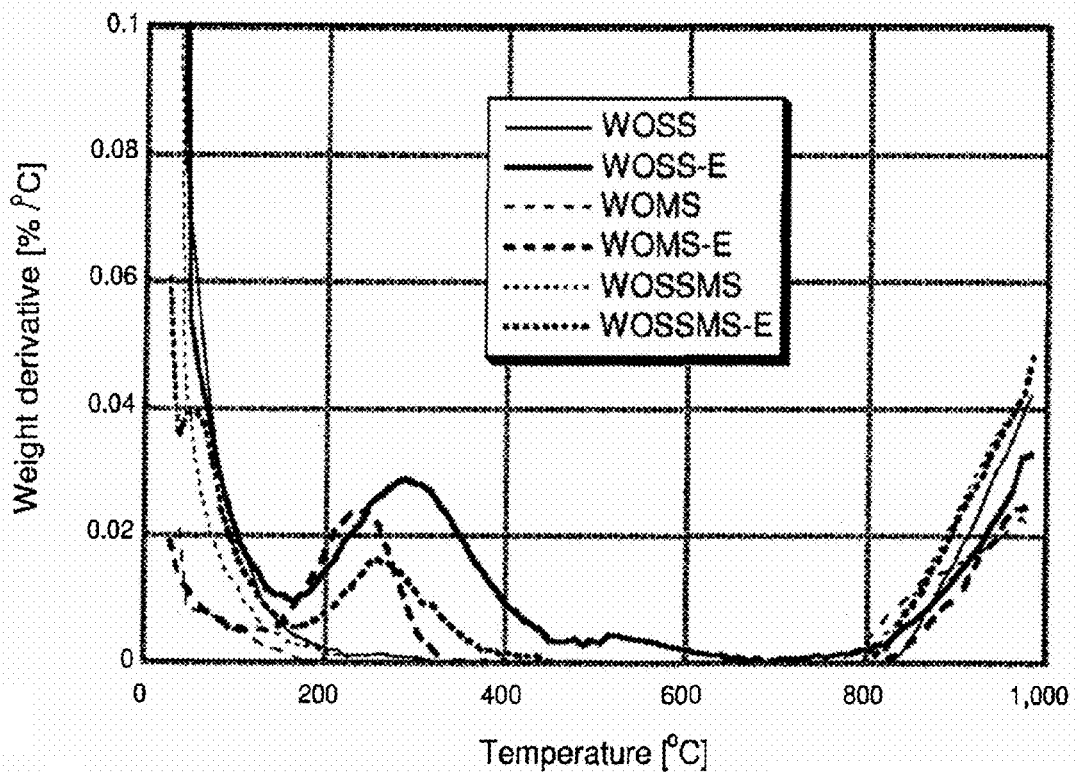
FIG. 9 illustrates DTG curves in nitrogen for initial and exhausted samples.

Thermal analysis was carried out to identify the oxidation products and to balance the amount of sulfur deposited on the surface and the results are below in Table 6. The peaks between 200-450° C., illustrated in FIG. 9, represent the removal of elemental sulfur.

TABLE 6

Weight losses in various temperature ranges and amount of sulfur adsorbed from $H_2S$ breakthrough capacity test. Weight loss is corrected for amount adsorbed in $H_2S$ breakthrough test (Bth. Cap.) (E—after exposure to $H_2S$).

| Sample | 20-150° C. | Δ | 150-450° C. | Δ | 450-700° C. | Δ | 800-1000° C. | Δ | Total Δ | S Bth Capacity |
|---|---|---|---|---|---|---|---|---|---|---|
| WO | 3.02 | | 0.84 | | 0.05 | | 2.3 | | | |
| WO-E | 2.31 | 0 | 9.20 | 8.36 | 1.0 | 0.95 | 1.9 | 0.0 | 9.31 | 10.2 |
| SS | 2.40 | | 1.15 | | 0.12 | | 4.96 | | | 6.22 |
| SS-E | 3.45 | 1.0 | 1.15 | 0 | 0.03 | 0 | 2.7 | | 6.8 | 4.23 |
| WOSS | 3.48 | | 0.21 | | 0.43 | | 2.67 | | | |
| WOSS-E | 3.15 | 0 | 5.85 | 5.64 | 0.53 | 0.1 | 2.67 | 0 | 5.64 | 10.1 |
| WOMS | 0.58 | | +1.88 | | +0.80 | | 2.64 | | | |
| WOMS-E | 0.81 | 0.23 | 2.56 | 4.44 | +0.59 | 0.21 | 2.12 | 0 | 4.88 | 8.08 |
| WOSSMS | 1.77 | | 0.06 | | 0.55 | | 2.83 | | | |
| WOSSMS-E | 3.30 | 1.53 | 2.34 | 2.28 | 0.58 | 0.03 | 4.11 | 1.28 | 5.12 | 11.4 |

X-Ray fluorescence was used to evaluate the content of iron, and sulfur after exhaustion. The results are presented in Table 7. Although the total amount is not given the intensities of the peaks in arbitrary units are related to the amount of specific species.

TABLE 7

XRF results.

| Sample | Fe | S(E) |
|---|---|---|
| WO | 139.6 | 2496.86 |
| SS | 8584.02 | ND |
| MS | 12844.08 | ND |
| WOSS | 7321.80 | ND |
| WOMS | 12574.54 | 732.85 |
| WOSSMS | 12173.98 | 1352.93 |

Example 2

The homogeneous mixtures of waste sludges were prepared as listed in Table 8 and dried at 120° C. The dried samples were then crushed and pyrolized in a horizontal furnace at 650° C. for 30 min. The temperature ramp was 10 degrees/minute. An inert atmosphere was provided by 10 ml/min flow of nitrogen. The yields, ash content and densities of materials are listed in Table 8.

TABLE 8

Adsorbents' composition, yield, and densities
(LT—low temperature, 650° C.).

| Sample | Wet composition | Solid content | Dry composition | Yield (dry mass) | γ [g/cm$^3$] |
|---|---|---|---|---|---|
| WOLT | WO: 100% | 23.6 | WO: 100% | 32 | 0.26 |
| SSLT | SS: 100% | 24.6 | SS: 100% | 47 | 0.52 |
| MSLT | MS: 100% | 23.4 | MS: 100% |  | 0.47 |
| WOSSLT | WO: 50% SS: 50% | — | WO: 49% SS: 51% |  | 0.36 |
| WOMSLT | WO: 50% MS: 50% | — | WO: 50% MS: 50% | 58 | 0.38 |
| WOSSMSLT | WO: 40% SS: 40% MS 10% | — | WO: 46% SS: 31% MS 23% | 46 | 0.38 |

*Determined as mass left at 950° C. after thermol analyses run in air.

The performance of materials as sorbents for hydrogen sulfide was evaluated using lab developed breakthrough tests. Adsorbent samples were packed into a column (length 60 mm, diameter 9 mm, bed volume 6 cm$^3$) and pre-humidified with moist air (relative humidity 80% at 25° C.) for an hour. The amount of adsorbed water was estimated from the increase in the sample weight after pre-humidification (the sorbents were removed from the column and weighted). Moist air containing 0.3% (3,000 ppm) H$_2$S was then passed through the column of adsorbent at 1.4 L/min. The breakthrough of H$_2$S was monitored using an Interscan LD-17 H$_2$S continuous monitor system interfaced with a computer data acquisition program. The test was stopped at the breakthrough concentration of 350 ppm. The adsorption capacities of each sorbent in terms of grams of H$_2$S per gram of material were calculated by integration of the area above the breakthrough curves, and from the H$_2$S concentration in the inlet gas, flow rate, breakthrough time, and mass of sorbent. The obtained results are collected in Table 9.

TABLE 9

H$_2$S breakthrough capacities, adsorption of water
and surface pH before and after H$_2$S adsorption
(LT—low temperature, 650° C.; E—after exposure to H$_2$S).

| Sample | Brth capacity [mg/g] | Bth capacity [mg/cm$^3$] | Water adsorbed [mg/g] | pH | pH-E |
|---|---|---|---|---|---|
| WOLT | 315 | 82 | 48 | 9.3 | 9.3 |
| SSLT | 9 | 5 | 18 | 10.9 | 11.1 |
| MSLT | 79 | 37 | 0 | 7.8 | 7.1 |
| WOSSLT | 146 | 53 | 21 | 9.2 | 9.1 |
| WOMSLT | 130 | 49 | 14 | 9.8 | 9.4 |
| WOSSMSLT | 73 | 33 | 20 | 9.7 | 9.2 |

Characterization of pore sizes and adsorption capacity of materials prepared was accomplished using physical sorption measurement. Equilibrium adsorption isotherms of N$_2$ will be measured by volumetric techniques. From the isotherms the pore size distribution was evaluated using the Density Functional Theory (DFT). The surface area was calculated using BET approach and micropore volumes using Dubinin-Radushkevich equation (DR). The results are presented in Table 10. The symbol "Δ" represents the difference in the specific pore volume before and after deposition of sulfur.

TABLE 10

Parameters of porous structure (LT—low temperature,
650° C.; E—after exposure to H$_2$S)

| Sample | $S_{BET}$ [m$^2$/g] | $V_{mic}$ [cm$^3$/g] | $\Delta V_{mic}$ [cm$^3$/g] | $V_{mes}$ [cm$^3$/g] | $\Delta V_{mes}$ [cm$^3$/g] | $V_t$ [cm$^3$/g] | $V_{mic}/V_t$ |
|---|---|---|---|---|---|---|---|
| WOLT | 202 | 0.074 |  | 0.765 |  | 0.839 | 10 |
| WOLT-E | 83 | 0.032 | −0.42 | 0.434 | −0.321 | 0.517 | 6 |
| SSLT | 92 | 0.037 |  | 0.113 |  | 0.150 | 25 |
| SSLT-E | 79 | 0.029 | −0.008 | 0.106 | −0.007 | 0.135 | 27 |
| MSLT | 34 | 0.014 |  | 0.122 |  | 0.136 | 11 |
| MSLT-E | 25 | 0.011 | −0.003 | 0.160 | 0.038 | 0.171 | 6 |
| WOSSLT | 154 | 0.058 |  | 0.459 |  | 0.517 | 12 |
| WOSSLT-E | 72 | 0.027 | −0.031 | 0.281 | −0.178 | 0.308 | 10 |
| WOMSLT | 92 | 0.036 |  | 0.270 |  | 0.306 | 12 |
| WOMSLT-E | 65 | 0.026 | −0.010 | 0.265 | −0.005 | 0.291 | 9 |
| WOSSMSLT | 110 | 0.042 |  | 0.372 |  | 0.415 | 10 |
| WOSSMSLT-E | 59 | 0.023 | −0.011 | 0.250 | −0.122 | 0.273 | 8 |

Thermal analysis was carried out to identify the oxidation products and to balance the amount of sulfur deposited on the surface is listed in Tables 11A and 11B, noting two different temperature ranges.

Tables 11A and 11B—Weight losses [in %] in various temperature ranges and amount of sulfur adsorbed from $H_2S$ breakthrough capacity test [in %]. Weight loss is corrected for amount adsorbed in $H_2S$ breakthrough test (Bth. Cap.); (LT—low temperature, 650° C.; E—after exposure to $H_2S$).

The amount of adsorbed water was estimated from the increase in the sample weight after pre-humidification (the sorbents were removed from the column and weighted). Moist air containing 0.3% (3,000 ppm) $H_2S$ was then passed through the column of adsorbent at 1.4 L/min. The breakthrough of $H_2S$ was monitored using an Interscan LD-17 $H_2S$ continuous monitor system interfaced with a computer data acquisition program. The test was stopped at the breakthrough concentration of 350 ppm. The adsorption capacities

TABLE 11A

| Sample | 20-150° C. | Δ | 150-450° C. | Δ | 450-700° C. | Δ | 800-1000° C. | Δ | Total Δ | S brth capacity |
|---|---|---|---|---|---|---|---|---|---|---|
| WOLT | 4.70 | | 1.85 | | 1.00 | | 6.69 | | | |
| WOLT-E | 7.21 | 2.51 | 34.6 | 32.75 | 4.88 | 3.88 | 7.28 | 0.59 | 39.7 | 29.6 |
| SSLT | 1.86 | | 0.59 | | 0.97 | | 9.18 | | | |
| SSLT-E | 3.34 | 1.48 | 1.40 | 0.81 | 1.93 | 0.96 | 9.53 | 0.35 | 3.6 | 8.4 |
| WOSSLT | 3.56 | | 1.49 | | 1.04 | | 10.46 | | | |
| WOSSLT-E | 5.20 | 1.64 | 15.9 | 14.41 | 2.87 | 1.83 | 12.17 | 1.71 | 19.59 | 13.7 |

TABLE 11B

| Sample | 20-150° C. | Δ | 150-400° C. | Δ | 400-650° C. | Δ 150-650° C. | Total Δ | S brth capacity |
|---|---|---|---|---|---|---|---|---|
| WOLT | 4.70 | | 1.71 | | 0.77 | | | |
| WOLT-E | 5.42 | 0.72 | 23.35 | 21.64 | 3.41 | 2.64 | 31.6 | 31 |
| SSLT | 1.86 | | 0.46 | | 0.68 | | | |
| SSLT-E | 3.08 | 1.22 | 1.03 | 0.57 | 1.48 | 0.80 | 1.38 | 0.9 |
| MSLT | 3.66 | | 1.37 | | 0.78 | | | |
| MSLT-E | 4.48 | 0.82 | 13.3 | 11.93 | 2.28 | 1.5 | 15.2 | 14.3 |
| WOSSLT | 1.01 | | 0 | | 2.49 | | | |
| WOSSLT-E | 1.16 | 0.15 | 6.62 | 6.62 | 2.13 | 0 | 7.14 | 7.7 |
| WOMSLT | 3.31 | | 0 | | 0.93 | | | |
| WOMSLT-E | 2.86 | 0 | 6.13 | 6.13 | 2.78 | 1.85 | 9.00 | 12.7 |
| WOSSMSLT | 1.52 | | 0 | | 3.23 | | | |
| WOSSMSLT-E | 4.65 | 3.13 | 8.2 | 8.2 | 3.16 | 0 | 9.20 | 12.0 |

Example 3

The homogeneous mixtures of waste sludges were prepared as listed in Table 12 and dried at 120° C. The dried samples were then crushed and pyrolyzed in a horizontal furnace at 950° C. for 60 min. The temperature ramp was 10 deg/min. An inert atmosphere was provided by 10 ml/min flow of nitrogen. The yields and densities of the materials are listed in Table 12.

TABLE 12

Adsorbents' composition and their densities (60 for minutes in furnace)

| Sample | Wet composition | Solid content | Dry composition | γ [g/cm³] |
|---|---|---|---|---|
| WO60 | WO: 100% | 23.6 | WO: 100% | 0.47 |
| SS60 | SS: 100% | 24.6 | SS: 100% | 0.46 |
| MS60 | MS: 100% | 23.4 | MS: 100% | 0.84 |
| WOSS60 | WO: 50% SS: 50% | — | WO: 49% SS: 51% | 0.41 |
| WOMS60 | WO: 50% MS: 50% | — | WO: 50% MS: 50% | 0.46 |
| WOSSMS60 | WO: 40% SS: 40% MS 10% | — | WO: 46% SS: 31% MS 23% | 0.45 |

The performance of materials as sorbents for hydrogen sulfide was evaluated using lab developed breakthrough tests. Adsorbent samples were packed into a column (length 60 mm, diameter 9 mm, bed volume 6 cm³) and prehumidified with moist air (relative humidity 80% at 25° C.) for an hour.

of each sorbent in terms of grams of $H_2S$ per gram of material were calculated by integration of the area above the breakthrough curves, and from the $H_2S$ concentration in the inlet gas, flow rate, breakthrough time, and mass of sorbent. The obtained results are collected in Table 13.

TABLE 13

$H_2S$ breakthrough capacities, adsorption of water and surface pH before and after $H_2S$ adsorption (E—after exposure to $H_2S$) (60 for minutes in furnace)

| Sample | Brth capacity [mg/g] | Bth capacity [mg/cm³] | Water adsorbed [mg/g] | pH | pH-E |
|---|---|---|---|---|---|
| WO60 | 61 | 29 | 11 | 10.7 | 10.2 |
| SS60 | 78 | 36 | 26 | 10.5 | 9.3 |
| MS60 | 2 | 1.7 | 0 | 9.8 | 9.6 |
| WOSS60 | 78 | 32 | 36 | 11.8 | 9.8 |
| WOMS60 | | | | | 9.4 |
| WOSSMS60 | 73 | 33 | 20 | 10.7 | 10.2 |

Example 4

X-ray diffraction measurements were conducted on WO, SS, MS, WOSS and WOSSMS adsorbent samples using standard powder diffraction procedure. Adsorbents were ground with methanol in a small agate mortar. Grinding of the adsorbents by hand ensures particle sizes between 5-10 μm, which prevents line broadening in diffraction peaks. The mixture was smear-mounted onto the zero-background quartz window of a Philips specimen holder and allow to air dry. Samples were analyzed by Cu $K_\alpha$ radiation generated in a Phillips XRG 300 X-ray diffractometer. A quartz standard slide was run to check for instrument wander and to obtain accurate location of 2Θ peaks.

In the waste oil based sludge sample heated at 650° C. (WO650) only metallic copper was detected as a separate crystallographic phase. See, FIG. 10. In the case of SS650, quartz ($SiO_2$), cristobalite ($SiO_2$), truscottite ($Ca_{14}Si_{24})O_{58}(OH)_8 \cdot 2H_2O$), and metallic iron are present. After mixing two components and heating at 650° C., besides quartz, cristobalite and metallic iron and copper, anorthite ($CaAl_2Si_2O_8$) and diaspore (AlO(OH)) are detected.

Figure 10:
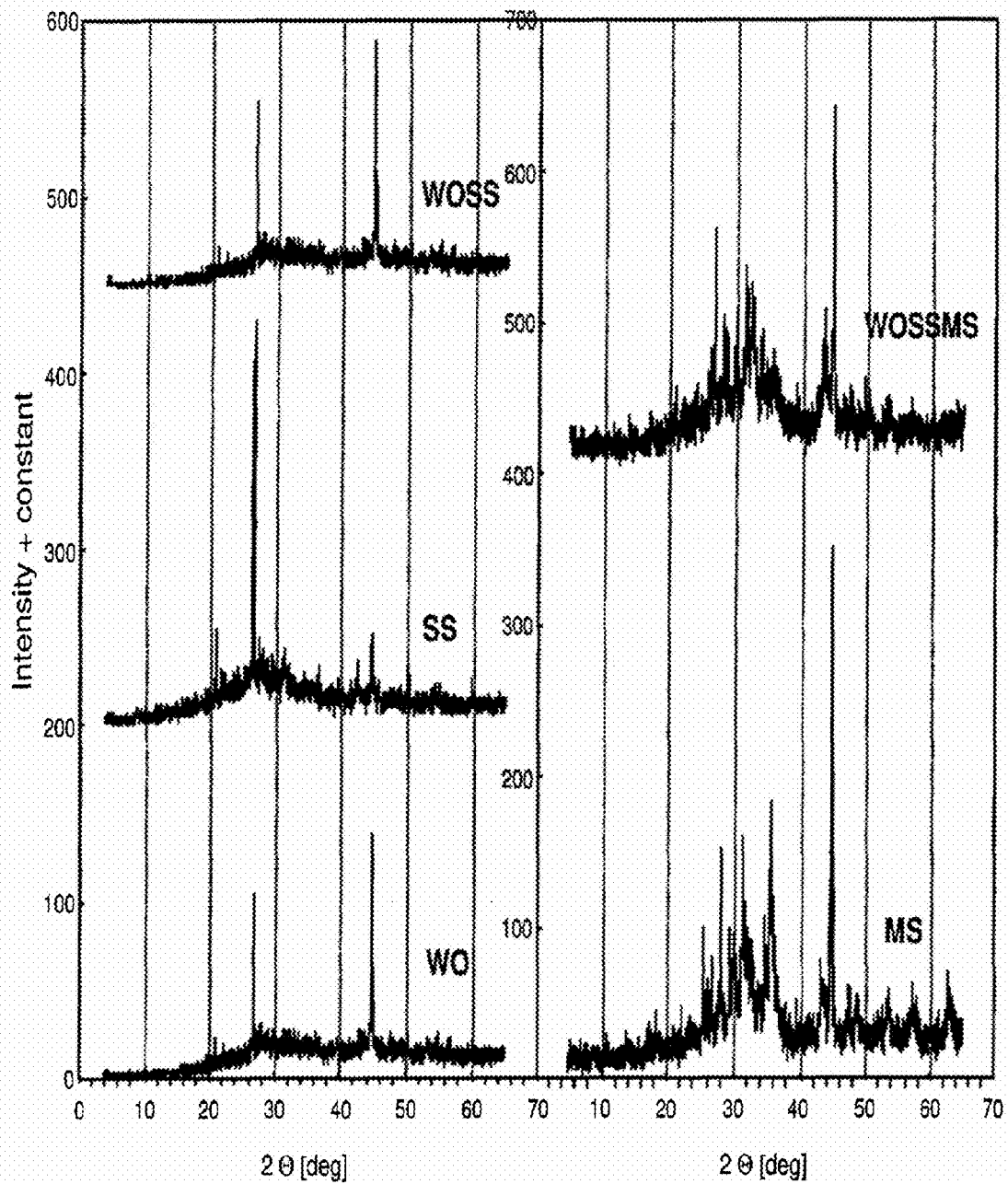
FIG. 10 shows X-ray diffraction patterns for samples obtained at 650° C.

Comparison of the diffraction patterns presented in FIG. 10 clearly shows the synergetic effect in the chemical composition of materials. New components formed having their origin on addition of silica (coming from sewage sludge), and iron and zinc from waste oil sludge. These results indicated formation of new phases with an increase in the pyrolysis temperature and time. FIG. 10 shows the changes in chemistry after pyrolysis for half an hour at 650° C. while FIGS. 7A and 7B compare the sample pyrolyzed at 950° C.

The examples of crystallographic phases found for samples pyrolyzed at various conditions are presented in Tables 14 and 15. The headings indicate the composition of the sample, the temperature it was pyrolyzed at and the duration of the pyrolysis. For example, SS650-0.5 is sewage sludge pyrolyzed at 650° C. for 30 minutes.

TABLE 14

Crystallographic phases identified based on XRD analysis (650° or 950° C. for the temperature. The sample was heated to 0.5 hours (or 30 minutes) of pyrolization)

| SS650-0.5 | WO650-0.5 | WOSS650-0.5 | SS950-0.5 | WO950-0.5 | WOSS950-0.5 |
|---|---|---|---|---|---|
| Aluminum Al | Aluminum Al | Anorthite $CaAl_2Si_2O_8$ | | | |
| Iron, Fe | | Iron, Fe | | Iron, Fe | |
| | | | | | Bayerite $Al(OH)_3$ |
| | | | Bornite $Cu_5FeS_4$ | Bornite $Cu_5FeS_4$ | Bornite $Cu_5FeS_4$ |
| | | | | | Maghemite $Fe_2O_3$ |
| | | | | | Cohenite $Fe_3C$ |
| | | | | | Lawsonite $CaAl_2Si_2O_7(OH)_2H_2O$ |
| | | | Hibonite $CaAl_{12}O_{19}$ | | |
| | | Diaspore AlO(OH) | Ankerite $Ca(Fe,Mg)CO_3)_2$ | | |
| Calcite magnesium | Huntite $Mg_3Ca(CO_3)_4$ | | Vaterite $CaCO_3$ | Vaterite $CaCO_3$ | |
| Sapphirine $(Mg_4Al_4)Al_4Si_2O_{20}$ | Sapphirine $(Mg_4Al_4)Al_4Si_2O_{20}$ | | | | Sapphirine $(Mg_4Al_4)Al_4Si_2O_{20}$ |
| | | | Spinel $MgAl_2O_4$ | | Spinel $MgAl_2O_4$ |
| | Barringerite $Fe_2P$ | | | Zincite ZnO | Zincite ZnO |
| | | | Wurtizite ZnS | | Wurtzite ZnS |
| | Goethite FeO(OH) | | Ferroxyhite, goethite FeO(OH) | Lepidicrocite, FeO(OH) | |
| | Almandine $Fe_3Al_2(SiO_4)_3$ | | | | Smithsonite $ZnCO_3$ |
| Quartz, Cristobalite $SiO_2$ | | | Quartz $SiO_2$ | Quartz $SiO_2$ | |

TABLE 15

Crystallographic phases identified based on XRD analysis (650° and 950° C. for the temperatures the sample was heated to)

| MS650 | MS950 | WOSSMS650 | WOSSMS950 |
|---|---|---|---|
| Aluminum | Aluminum Al | | |
| Iron, Fe | Iron, Fe | Iron Fe | |
| | Copper, Cu | Copper, Cu | |
| | Zinc, Zn | | |
| | | | Huntite $Mg_5Ca(CO_3)$ |
| | | | Hematite, $Fe_2O_3$ |

TABLE 15-continued

Crystallographic phases identified based on XRD analysis (650° and 950° C. for the temperatures the sample was heated to)

| MS650 | MS950 | WOSSMS650 | WOSSMS950 |
|---|---|---|---|
| | Fersilicite, FeSi | | |
| Moisanite, SiC | | | |
| Margarite, CaAl(Si$_2$Al$_2$)O$_{10}$(OH)$_2$ | | | |
| Almandine Fe$_3$Al$_2$(SiO$_4$)$_3$ | | Sphalerite, ZnS | |
| | Pyrrhotite, Fe$_{1-x}$S | Pyrrhotite, Fe$_{1-x}$S | Pyrrhotite, Fe$_{1-x}$S |
| | Trioilite, FeS | Trioilite, FeS | Trioilite, FeS |
| | Pyrope, Mg$_3$Al$_2$(SiO$_4$)$_3$ | | Spinel MgAl$_2$O$_4$ |
| | Chalocopyrite CuFeS$_2$ | | |
| | Pyrrohotite Fe$_7$S$_8$ | | Sphalerite ZnS |
| | | Zhanghengite, CuZn | |
| | | Quartz, SiO$_2$ | |
| Quartz, Cristobalite SiO$_2$ | | Moganite, SiO$_2$ | |

Thus, in sewage sludge origin materials obtained at 950° C. such spinel-like compounds as wurtzite (ZnS), ferroan (Ca$_2$(Mg,Fe)$_5$(SiAl)$_8$O$_{22}$(OH)$_2$), chalcocite (Cu$_{1.96}$S), spinel (MgAl$_2$O$_4$), and feroxyhite (FeO(OH)) were found. In waste oil-based materials besides metallic iron, bornite (Cu$_5$FeS$_4$), hibonite (CaAl$_{12}$O$_{19}$), zincite (ZnO), ankerite (Ca(Fe, Mg)(CO$_3$)$_2$) are present. In metal sludge based adsorbent aluminum, metallic iron, copper, zinc, pyrope (Mg$_3$Al$_2$(SiO$_4$)$_3$), perrohotite (Fe$_7$S$_8$), Chalocopyrite (CuFeS$_2$), Triolite (FeS) and Fersilicite, (FeSi) exist. Mixing sludges results in synergy enhancing the catalytic properties which is linked to formation of new entities such as sapphirine (Mg$_{3.5}$Al$_9$Si$_{1.5}$O$_{20}$), maghemite (Fe$_2$O$_3$), cohenite (Fe$_3$C), lawsonite (CaAl$_2$Si$_2$O$_7$(OH)2H$_2$O), smithsonite (ZnCO$_3$), sphalerite (ZnS), and hematite (Fe$_2$O$_3$).

The materials obtained at 650° C. differ significantly from those obtained at 950° C. In the latter, more double-component crystallographic phases (metal-nonmetal) are present with metals at lower oxidation states. The samples pyrolyzed at 650° C. contain more aluminosilicates with calcium, magnesium and iron cations.

Example 5

The performance of adsorbents obtained at 650° C. and 950° C. for 0.5 hour or 1 hour as H$_2$S removal media was compared. The results are presented in Tables 16-18.

TABLE 16

H$_2$S breakthrough capacities, amount of water pre-adsorbed, and pH values for the initial and exhausted adsorbents.

| Sample | H$_2$S Brth. Cap. [mg/g] | H$_2$S Brth. Cap. [mg/cm$^3$] | Water adsorbed [mg/g] | pH | pH-E |
|---|---|---|---|---|---|
| WO650-0.5 | 315 | 82 | 48 | 9.3 | 9.3 |
| WO950-0.5 | 109 | 52 | 0 | 9.9 | 9.4 |
| WO950-1 | 62 | 29 | 11 | 10.7 | 10.2 |
| SS650-0.5 | 9 | 5 | 18 | 10.9 | 11.1 |
| SS950-0.5 | 42 | 21 | 26 | 10.9 | 10.0 |
| SS950-1 | 78 | 36 | 26 | 10.5 | 9.3 |
| WOSS950-0.5 | 146 | 53 | 21 | 9.2 | 9.1 |

TABLE 16-continued

H$_2$S breakthrough capacities, amount of water pre-adsorbed, and pH values for the initial and exhausted adsorbents.

| Sample | H$_2$S Brth. Cap. [mg/g] | H$_2$S Brth. Cap. [mg/cm$^3$] | Water adsorbed [mg/g] | pH | pH-E |
|---|---|---|---|---|---|
| WOSS950-0.5 | 108 | 50 | 11 | 10.8 | 9.1 |
| WOSS950-1 | 78 | 32 | 36 | 11.8 | 9.4 |

TABLE 17

Shift in the pH-ΔpH between initial and exhausted samples, amount of sulfur expected based on the H$_2$S breakthrough capacity-SBT, weight loss between 150-400° C., ΔW, and selectivity for oxidation to elemental sulfur, S$_{el}$

| Sample | ΔpH | S$_{BT}$ [%] | ΔW [%] | S$_{el}$ [%] |
|---|---|---|---|---|
| WO650-0.5 | 0 | 30.8 | 22.52 | 73 |
| WO950-0.5 | 0.5 | 10.7 | 6.04 | 56 |
| WO950-1 | 0.5 | 6.1 | 4.39 | 72 |
| SS650-0.5 | 0 | 0.8 | 0.15 | 19 |
| SS950-0.5 | 0.9 | 4.1 | 2.02 | 47 |
| SS950-1 | 0.8 | 7.7 | 4.32 | 56 |
| WOSS650-0.5 | 0.1 | 14.2 | 11.91 | 83 |
| WOSS950-0.5 | 1.7 | 10.6 | 4.58 | 42 |
| WOSS950-1 | 2.4 | 7.7 | 6.32 | 82 |

TABLE 18

Structural parameters calculated from nitrogen adsorption isotherms

| Sample | S$_{BET}$ [m$^2$/g] | V$_{mic}$ [cm$^3$/g] | V$_{mes}$ [cm$^3$/g] | V$_t$ [cm$^3$/g] | V$_{mes}$/V$_t$ |
|---|---|---|---|---|---|
| WO650-0.5 | 202 | 0.074 | 0.765 | 0.839 | 0.92 |
| WO650-0.5E | 83 | 0.032 | 0.434 | 0.517 | 0.84 |
| WO950-0.5 | 132 | 0.050 | 0.314 | 0.364 | 0.86 |
| WO950-0.5E | 96 | 0.054 | 0.355 | 0.389 | 0.91 |
| WO950-1 | 92 | 0.037 | 0.303 | 0.340 | 0.89 |
| WO950-1E | 64 | 0.024 | 0.275 | 0.299 | 0.92 |
| SS650-0.5 | 92 | 0.037 | 0.113 | 0.150 | 0.75 |
| SS650-0.5E | 79 | 0.029 | 0.106 | 0.135 | 0.78 |
| SS950-0.5 | 141 | 0.058 | 0.151 | 0.209 | 0.72 |

TABLE 18-continued

Structural parameters calculated from nitrogen adsorption isotherms

| Sample | $S_{BET}$ [m²/g] | $V_{mic}$ [cm³/g] | $V_{mes}$ [cm³/g] | $V_t$ [cm³/g] | $V_{mes}/V_t$ |
|---|---|---|---|---|---|
| SS950-0.5E | 121 | 0.032 | 0.190 | 0.222 | 0.85 |
| SS950-1 | 125 | 0.049 | 0.138 | 0.187 | 0.74 |
| SS950-1E | 47 | 0.018 | 0.124 | 0.132 | 0.94 |
| WOSS650-0.5 | 154 | 0.058 | 0.459 | 0.517 | 0.89 |
| WOSS650-0.5E | 72 | 0.027 | 0.281 | 0.308 | 0.91 |
| WOSS950-0.5 | 150 | 0.061 | 0.163 | 0.224 | 0.73 |
| WOSS950-0.5E | 89 | 0.030 | 0.258 | 0.288 | 0.89 |
| WOSS950-1 | 199 | 0.075 | 0.377 | 0.447 | 0.84 |
| WOSS950-1E | 79 | 0.031 | 0.269 | 0.300 | 0.90 |

Figure 11:
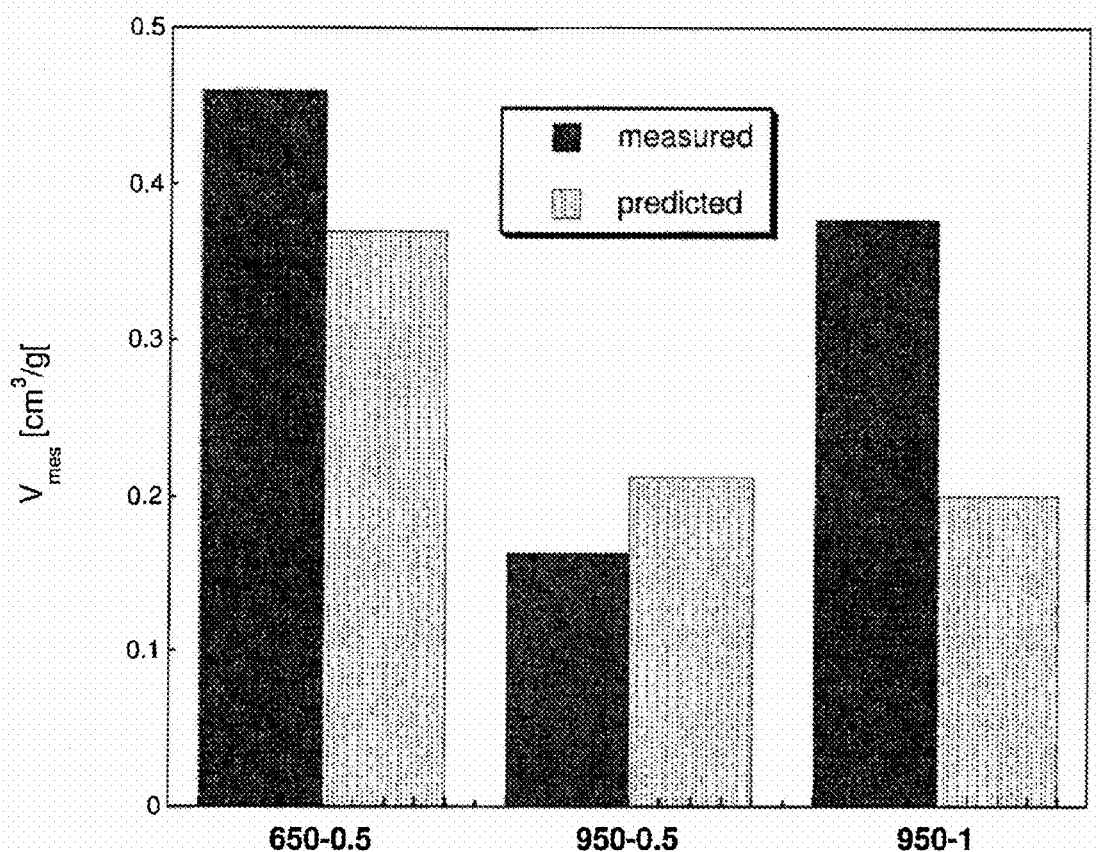
FIG. 11 illustrates a comparison of the measured and predicted mesopores volume for WOSS samples obtained at various conditions.
Figure 12:
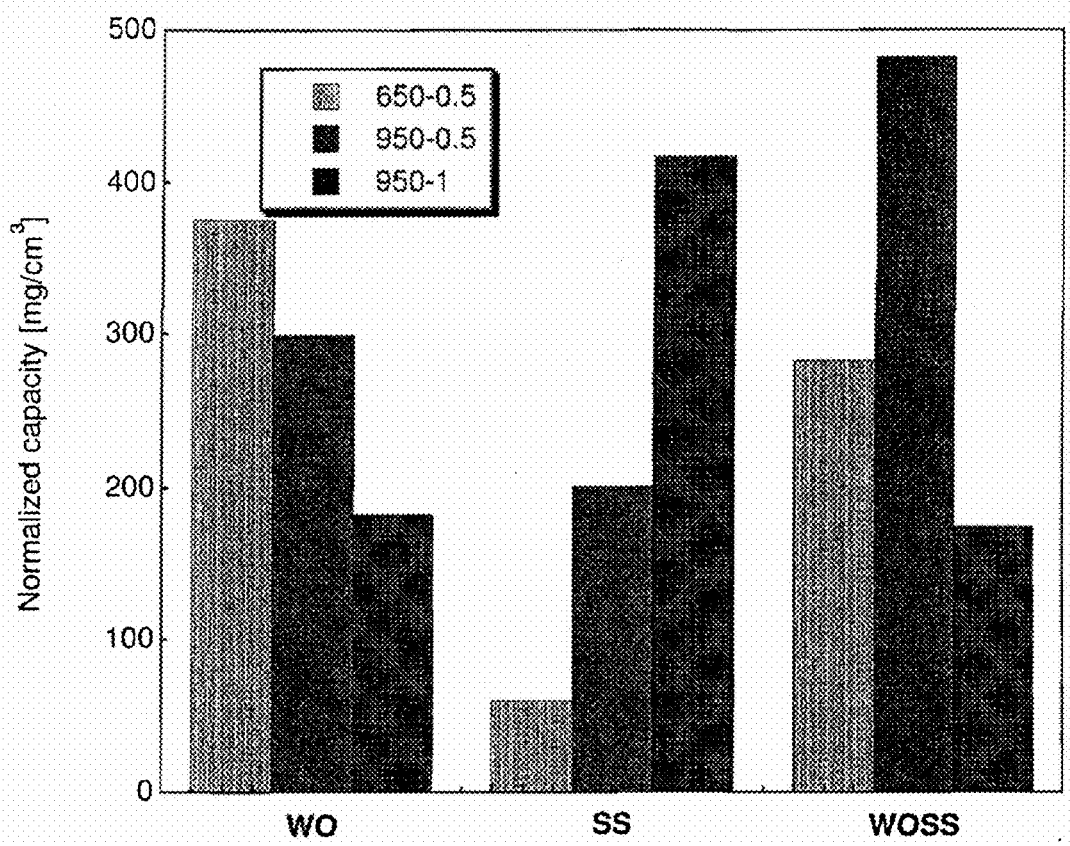
FIG. 12 illustrates a comparison of the measured and predicted $H_2S$ breakthrough capacities for samples obtained at various conditions.

The results demonstrate the possibility of obtaining the valuable desulfurization catalysts from mixture of waste oil sludge and sewage sludge. Up to 30 wt % hydrogen sulfide can be retained on their surface. The surface properties, such as porosity, selectivity, or catalytic activity can be modified by changing the pyrolysis conditions. The catalytic activity and hydrogen sulfide removal capacity are directly related to the new surface chemistry formed by solid-state reactions during pyrolysis. This chemistry can also be controlled to certain degree by varying the composition of the precursor mixture. As a result of the synergy between the sludge components new chemistry and porosity is formed which enhances both the physicochemical properties of the materials and their performance. FIG. 11 shows the comparison of the predicted (based on the composition and yield of the individual components) and measured volume of mesopores while FIG. 12 compares the predicted and measured $H_2S$ breakthrough capacities.

Example 6

Equilibrium studies for adsorption of acid red and basic fuchsin were conducted in a series of 100 ml Erlenmeyer flasks at 293 K. Each flask was filled with 10 ml of dye solution with concentrations between 10-1000 mg/l. After equilibration, the samples were filtrated, analyzed for their dyes content and the equilibrium adsorption capacity was calculated. The equilibrium data was fitted to the so-called Langmuir-Freundlich single solute isotherm. The results are presented in Table 19. The variable $q_m$ is the adsorption capacity per unit gram of adsorbent, K is the Langmuir-type equilibrium constant, and the exponential term n is the heterogeneity parameter of the site energy.

TABLE 19

Fitting parameters to Langmuir-Freundlich isotherm

| ample | $q_m$ [mg dye/g] | K [l/mg] | n | $R^2$ |
|---|---|---|---|---|
| Acid Red1 | | | | |
| SS | 45.00 | 0.10 | 0.44 | 0.9706 |
| WO | 46.35 | 0.14 | 0.23 | 0.9757 |
| WOSSO | 71.19 | 0.17 | 0.75 | 0.9610 |
| WOSS650 | 68.40 | 0.15 | 0.74 | 0.9325 |
| WVA | 71.42 | 0.029 | 0.76 | 0.9919 |
| Basic Fuchsin | | | | |
| SS | 70.36 | 0.03 | 0.36 | 0.9969 |
| WO | 94.21 | 0.18 | 0.65 | 0.9851 |
| WOSS | 126.89 | 0.29 | 0.59 | 0.9929 |
| WOSS650 | 105.94 | 0.15 | 0.57 | 0.9804 |

The adsorption capacity is much higher than that for commercial activated carbon and it is attributed to the high volume of mesopores and the presence of mineral-like structures, which can participate in ion exchange reactions and precipitation reactions.

Example 7

To check the effect of water exposure on the porosity of samples, the materials were dispersed in water and shake in room temperature for 24 hours. After drying the surface area, pore volumes and the average pore sizes were determined. The results indicted an increase in the volume of mesopores are as a result of the reaction of inorganic oxides/salts with water. The results are presented in Table 20. Δ is the average pore size.

TABLE 20

Structural parameter ($H_2O$ denotes the water exposed sample)

| Sample | $S_{BET}$ (m²/g) | $V_{mic}$ (cm³/g) | $V_{mes}$ (cm³/g) | $V_t$ (cm³/g) | $V_{mic}/V_t$ | Δ (Å) |
|---|---|---|---|---|---|---|
| SS950 | 103 | 0.043 | 0.100 | 0.143 | 0.301 | 56 |
| SS950-$H_2O$ | 100 | 0.041 | 0.095 | 0.136 | 0.302 | 55 |
| W950 | 128 | 0.047 | 0.363 | 0.414 | 0.114 | 130 |
| WO950-$H_2O$ | 109 | 0.040 | 0.390 | 0.431 | 0.093 | 158 |
| WOSS950 | 192 | 0.077 | 0.279 | 0.356 | 0.216 | 74 |
| WOSS950-$H_2O$ | 174 | 0.068 | 0.301 | 0.369 | 0.184 | 85 |
| WOSS650 | 108 | 0.043 | 0.317 | 0.356 | 0.121 | 132 |
| WOSSO650-$H_2O$ | 199 | 0.077 | 0.253 | 0.332 | 0.232 | 67 |

Example 8

Equilibrium studies for adsorption of copper were conducted in a series of 100 ml Erlenmeyer flasks at 20° C. Each flask was filled with 10 ml of copper chloride solution with concentrations between 10-1000 mg/l. After equilibration, the samples were filtrated, analyzed for their coppers content and the equilibrium adsorption capacity was calculated. The equilibrium data was fitted to the so-called Langmuir-Freundlich single solute isotherm. The results are presented in Table 21. The variable $q_m$ is the adsorption capacity per unit gram of adsorbent, K is the Langmuir-type equilibrium constant, and the exponential term n is the heterogeneity parameter of the site energy. The adsorption capacity, especially for samples obtained at 650° C. is much higher than that on activated carbon.

TABLE 21

Fitting parameters of copper ($Cu^{2+}$) adsorption isotherms to Langmuir-Freundlich Equation

| Sample | $q_m$ [mg $Cu^{2+}$/g] | K [l/mg] | n | $R^2$ |
|---|---|---|---|---|
| SS650 | 63.48 | 0.009 | 0.65 | 0.9985 |
| WO650 | 74.28 | 0.025 | 0.72 | 0.9964 |
| WOSS650 | 69.72 | 0.018 | 0.78 | 0.9978 |
| SS950 | 34.01 | 0.001 | 0.51 | 0.9970 |
| WO950 | 15.88 | 0.006 | 0.92 | 0.9834 |
| WOSS950 | 47.08 | 0.001 | 0.43 | 0.9957 |

Example 9

The content of Fe, Ca, Cu, Zn, and Mg was determined in the single component samples, and based on the composition of the mixed samples, the content of these elements was evaluated. The results are presented in Table 22.

TABLE 22

| Sample | Fe [%] | Ca [%] | Mg [%] | Cu [%] | Zn [%] | Cr [ppm] |
|---|---|---|---|---|---|---|
| SS650 | 4.9 | 4.8 | 1.3 | 0.13 | 0.19 | 58 |
| SS950 | 6.1 | 5.1 | 1.1 | 0.17 | 0.09 | 90 |
| WO650 | 3.2 | 4.0 | 11.0 | 0.20 | 0.54 | 140 |
| WO950 | 3.7 | 5.1 | 8.4 | 0.25 | 0.51 | 280 |
| MS950 | 2.2 | 14 | 0.46 | 0.77 | 0.16 | 6700 |
| WOSS650* | 4.0 | 4.4 | 6.15 | 0.16 | 0.36 | 99 |
| WOSS950* | 4.9 | 5.1 | 4.75 | 0.21 | 0.3 | 185 |
| WOSSMS950* | 4.4 | 6.9 | 3.89 | 0.32 | 0.27 | 1488 |

*evaluated assuming the same yield of each component (50%).

Example 10

Materials

Two industrial sludges, waste oil sludge (WO) and metal sludge (M) were mixed with dry tobacco compost, homogenized, dried at 120° C. for 48 hours and then carbonized at 650° C. and 950° C. in nitrogen in a horizontal furnace. The heating rate was 10 deg/min with a one hour holding time. The weight of the wet industrial sludges (they contain 75% water) was adjusted to have 10% and 50% industrial sludge component based on the dry mass. The names of the adsorbents obtained, their compositions along with the yield, ash content and bulk density are collected in Table 23. Tobacco waste is referred to as TC.

The waste oil sludge was treated with $CaCl_2$, $Na_3PO_4$, NaOH and alum. Metal sludge treatment history includes addition of sulfuric acid and sodium hydroxide for pH adjustments, $Al_2SO_4$ for coagulation, anionic and cationic polymers, sodium bisulfide for chromium reduction, lime and $CaCl_2$. Thus, besides alkaline or alkaline earth element-containing compounds and iron, the waste oil sludge also contains 0.4% Cu, 2% Zn and between 200 and 1000 ppm of chromium, lead and nickel. In metal sludge there are less than 1% each of cadmium, chromium, copper, lead, manganese, selenium, vanadium and zinc. The content of volatile compounds in both waste oil sludge and metal sludge reaches 40% their dry mass, while the content of water in as-received materials is about 75%.

TABLE 23

Names of the adsorbents, their compositions, pyrolysis temperature, yield, bulk density an ash content (Reference 1 is a sample ratio of 90:10; reference 2 is a sample ratio of 50:50, Reference A denotes pyrolysis at 650° C. and Reference B denotes pyrolysis at 950° C.

| Sample | Dry waste composition | Pyrolysis Temperature [° C.] | Yield [%] | Bulk Density [g/cm³] | Ash [%] |
|---|---|---|---|---|---|
| CTCA | TC: 100% | 650 | 52 | 0.63 | 67 |
| CTCB | TC: 100% | 950 | 51 | 0.52 | 76 |
| CWOB | WO: 100% | 950 | 30 | 0.48 | 92 |
| CMB | M: 100% | 950 | 47 | 0.58 | ND |
| CTCWO-1A | TC 90%; WO 10% | 650 | 52 | 0.42 | 72 |
| CTCWO-2A | TC 50%; WO 50% | 650 | 53 | 0.41 | 67 |
| CTCWO-1B | TC 90%; WO10% | 950 | 45 | 0.40 | 78 |
| CTCWO-2B | TC: 50%; WO 50% | 950 | 38 | 0.40 | 86 |
| CTCM-1A | TC 90%; M 10% | 650 |  | 0.55 | 63 |
| CTCM-2A | TC 50%; M 50% | 650 | 65 | 0.52 | 86 |
| CTCM-1B | TC 90%; M 10% | 950 |  | 0.58 | 95 |
| CTCM-2B | TC 50%; M 50% | 950 | 57 | 0.30 | 96 |

Evaluation of $H_2S$ Sorption Capacity

A custom-designed dynamic test was used to evaluate the performance of adsorbents for $H_2S$ adsorption from gas streams as described above. Adsorbent samples were ground (1-2 mm particle size) and packed into a glass column (length 370 mm, internal diameter 9 mm, bed volume 6 cm³), and pre-humidified with moist air (relative humidity 80% at 25° C.) for one hour. The amount of water adsorbed was estimated from an increase in the sample weight. Moist air (relative humidity 80% at 25° C.) containing 0.3% (3,000 ppm) of $H_2S$ was passed through the column of adsorbent at 0.5 L/min. The flow rate was controlled using Cole Parmer flow meters. The breakthrough of $H_2S$ was monitored using MultiRae photoionization sensor. The test was stopped at the breakthrough concentration of 100 ppm. The adsorption capacities of each adsorbent in terms of mg of hydrogen sulfide per g of adsorbent were calculated by integration of the area above the breakthrough curves, and from the $H_2S$ concentration in the inlet gas, flow rate, breakthrough time, and mass of sorbent. For each sample the test was repeated at least twice. Besides $H_2S$ the content of $SO_2$ in the outlet gas was also monitored using MultiRae photoionization sensor. The adsorbents exhausted after $H_2S$ adsorption are designated by adding an additional letter E to their names.

Characterization of Pore Structure of Adsorbents

On the materials obtained sorption of nitrogen at its boiling point was carried out using ASAP 2010 (Micromeritics). Before the experiments, the samples were outgassed at 120° C. to constant vacuum (10-4 torr). From the isotherms, the surface areas (BET method), total pore volumes, $V_t$, (from the last point of isotherm at relative pressure equal to 0.99), volumes of micropores, $V_{mic}$ (DR), mesopore volume $V_{mes}$, total pore volume, $V_t$, along with pore size distributions were calculated (DFT).

pH

The pH of a carbonaceous sample suspension provides information about the acidity and basicity of the surface. A sample of 0.4 g of dry carbon powder was added to 20 mL of distilled water and the suspension was stirred overnight to reach equilibrium. Then the pH of suspension was measured.

Thermal Analysis

Thermal analysis was carried out using TA Instrument Thermal Analyzer. The instrument settings were: heating rate 10° C./min and a nitrogen atmosphere with 100 mL/min flow rate. For each measurement about 25 mg of a ground adsorbent sample were used. For analysis of the results the derivative thermogravimetric curves (DTG curves) are used. Ash content was determined from the residue left at 800° C. after heating the samples in air.

Elemental Analysis

Metal content in the adsorbents was determined using ICP in LSL labs, Syracuse, N.Y.

XRD

X-ray diffraction measurements were conducted using standard powder diffraction procedure. Adsorbents were ground with methanol in a small agate mortar. Grinding of the adsorbents by hand ensures particle sizes between 5-10 μm, which prevents line broadening in diffraction peaks. The mixture was smear-mounted onto the zero-background quartz window of a Phillips specimen holder and allow to air dry. Samples were analyzed by Cu $K_\alpha$ radiation generated in a Phillips XRG 300 X-ray diffractometer. A quartz standard slide was run to check for instrument wander and to obtain accurate location of 20 peaks.

Figure 13:
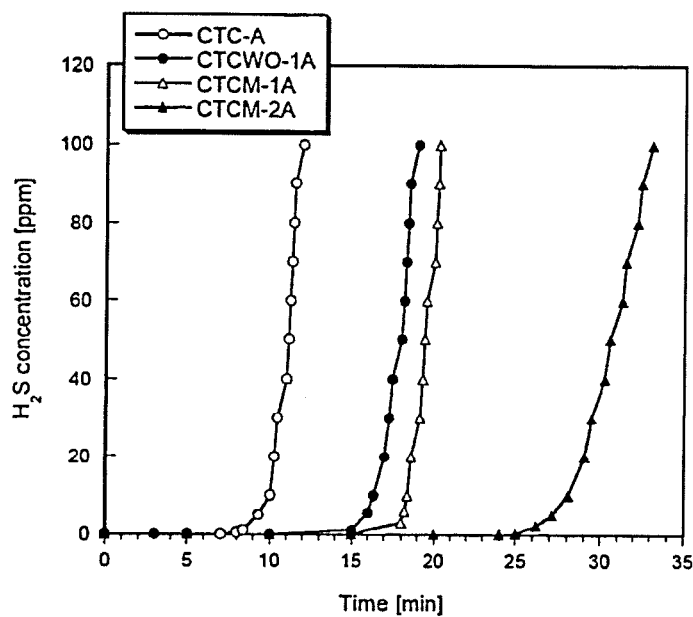
FIG. 13 illustrates the $H_2S$ breakthrough capacity curves for adsorbents obtained at 650° C.
Figure 14:
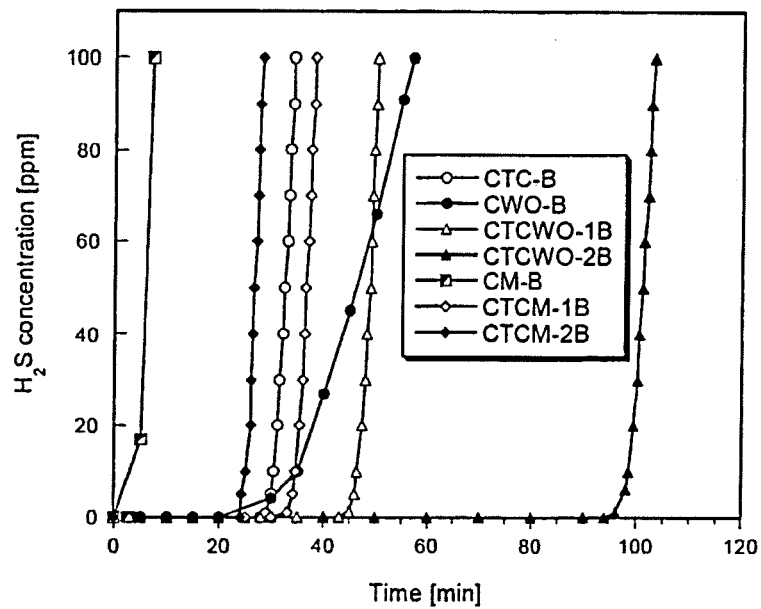
FIG. 14 illustrates the $H_2S$ breakthrough curves for adsorbents obtained at 950° C.

The $H_2S$ breakthrough curves are presented in FIGS. 13 and 14. As seen based on the steep rise in the breakthrough curves all tobacco based materials have short diffusion zone and almost immediately after $H_2S$ is detected in the outlet gas, the adsorbents stop to work allowing the challenge gas to pass chemically undisturbed through the bed. No $SO_2$ concentration was detected which indicates that all $H_2S$ is converted to sulfur. In the case of metal and oil sludge derived materials small concentrations of sulfur dioxide, up to few ppm were measured at the same time when hydrogen sulfide appeared in the outlet gas. Even after mixing 50% tobacco waste and 50% waste oil, the kinetics of hydrogen sulfide retention characteristic to tobacco were still predominant since the shape of the slope of the curve does not resemble the one obtained for waste oil derived adsorbent.

The results of the $H_2S$ breakthrough capacity measurements are summarized in Table 24 where besides the capacity expressed unit mass per gram of the adsorbents and per unit volume of the bed, the amount of water adsorbed during the prehumidification and the pH of the surface before and after adsorption process are reported.

As seen from Table 24, the highest capacity is found for tobacco waste oil sludge compositions pyrolyzed at 950° C. Although higher content of oil sludge is beneficial for the performance, even only 10% waste oil sludge increases the performance about 100% compared to pure tobacco waste based material. For CTC material the high temperature of pyrolysis also significantly enhances the capacity. The results suggest the predominant influence of the tobacco waste on the performance since the waste oil sludge derived materials were reported to have best capacity at low temperature. In fact, comparison of the capacity obtained for both tobacco and waste oils sludge based materials obtained at 950° C. clearly shows the synergetic effect; the capacity obtained for the mixture is much higher than for either one of its components.

TABLE 24

$H_2S$ breakthrough capacity, amount of water adsorbed and the pH values of adsorbent surfaces. (Reference 1 is a sample ratio of 90:10; reference 2 is a sample ratio of 50:50, Reference A denotes pyrolysis at 650° C., and Reference B denotes pyrolysis at 950° C.)

| Sample | $H_2S$ breakthrough capacity [mg/g] | $H_2S$ breakthrough capacity [mg/cm$^3$] | water adsorbed [mg/g] | pH initial | pH exhausted |
|---|---|---|---|---|---|
| CWOB | 40.2 | 21.1 | 11 | 10.7 | 10.2 |
| CMB | 5.0 | 2.9 | 0 | 11.2 | 11.2 |
| CTC-A | 6.6 | 4.2 | 51.8 | 11.2 | 10.7 |
| CTC-B | 23.1 | 12.1 | 38.2 | 11.3 | 11.3 |
| CTCWO-1A | 16.1 | 6.7 | 45.4 | 10.6 | 9.6 |
| CTCWO-2A | 0.9 | 0.4 | 82.0 | 9.2 | 9.2 |
| CTCWO-1B | 42.6 | 17.8 | 35.4 | 10.0 | 9.8 |
| CTCWO-2B | 90.2 | 36.4 | 43.3 | 10.3 | 9.3 |
| CTCM-1A | 13.0 | 7.2 | 29.6 | 10.6 | 10.5 |
| CTCM-2A | 22.5 | 11.7 | 11.2 | 9.4 | 9.3 |
| CTCM-1B | 23.1 | 13.5 | 21.5 | 11.2 | 11.1 |
| CTCM-2B | 18.9 | 5.7 | 10.8 | 10.8 | 10.6 |

As seen from Table 24, the highest capacity is found for tobacco waste oil sludge mixtures pyrolyzed at 950° C. Although higher content of oil sludge is beneficial for the performance, even only 10% waste oil sludge increases the performance about 100% compared to pure tobacco waste based material. For CTC material, the high temperature of pyrolysis also significantly enhances the capacity. These results suggest the predominant influence of the tobacco waste on the performance since the waste oil sludge derived materials were reported to have best capacity at low temperature. In fact comparison of the capacity obtained for both tobacco and waste oils sludge-based materials obtained at 950° C. clearly shows the synergetic effect; the capacity obtained for the mixture is much higher than for either one of its components.

Pyrolysis of waste oil sludge/tobacco mixture at 650° C. with a high content of waste oil sludge component has a detrimental effect on the capacity. Although on the surface of this sample the high amount of water is adsorbed, the capacity is negligible. Since the materials from waste oil sludge pyrolized at 650° C. had a very high capacity (reaching 30% wt.), the tobacco component hinders the capacity when low temperature treatment is applied. On the other hand, when metal sludge is used and mixture is pyrolyzed at low temperature, the capacity is enhanced compared to pure tobacco or pure metal sludge. Pyrolyzing those two mixtures at high temperature enhances capacity for low sludge content indicating once again the importance of the tobacco phase for hydrogen sulfide removal on composite adsorbents.

Figure 15:
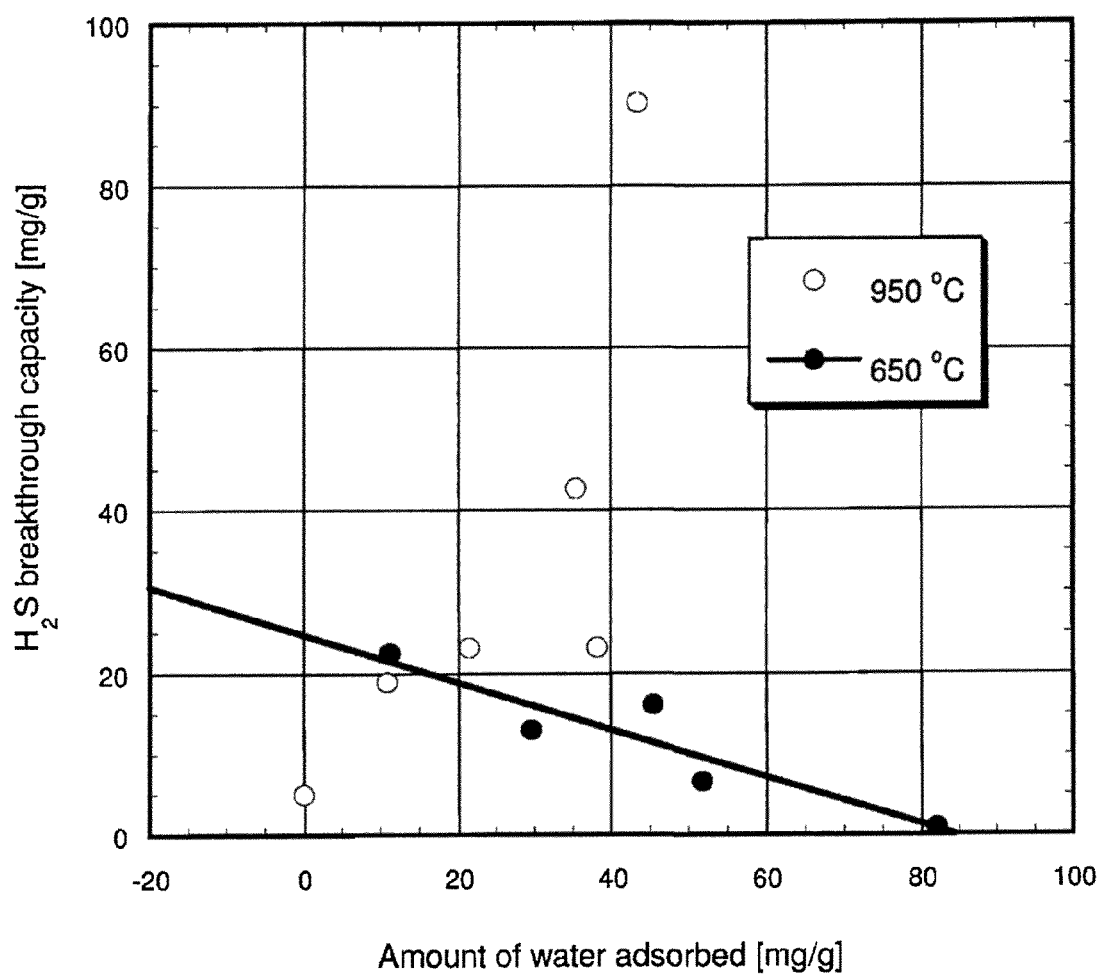
FIG. 15 illustrates the dependence of the $H_2S$ breakthrough capacity on the amount of preadsorbed water.

Taking into account variations in the behavior of the samples within their pyrolysis temperature, the relationship between the amount of water preadsorbed and the $H_2S$ breakthrough capacity was analyzed. As seen from FIG. 15, for the samples pyrolyzed at low temperature have a detrimental effect on the $H_2S$ breakthrough capacity. This may be linked to the low degree of mineralization and reactivity of the surface. It is likely that exposure to water causes its reaction with metal oxides and formation of hydroxides, which was observed previously. If the small pores are present, those hydroxides may block their entrances and thus decrease the available space for $H_2S$ adsorption and sulfur storage. This problem is readdressed below were the porosity is discussed.

In the case of samples pyrolyzed at 950° C., water apparently enhances the capacity. This might be linked to its physical retention on the surface and formation of water film, in which the basic pH exists. This enables high concentration of $HS^-$ ions and thus their oxidation to elemental sulfur.

All samples have basic pH, which helps with in hydrogen sulfide removal. The lowest pH is found for the CTCWO-2A sample, which has also the very low $H_2S$ removal capacity. That pH is much lower than the pH of its components. The reason for this might be either in oxidation of the carbon phase or specific chemistry formed as a result of synergetic effect between the composite components.

Figure 16:
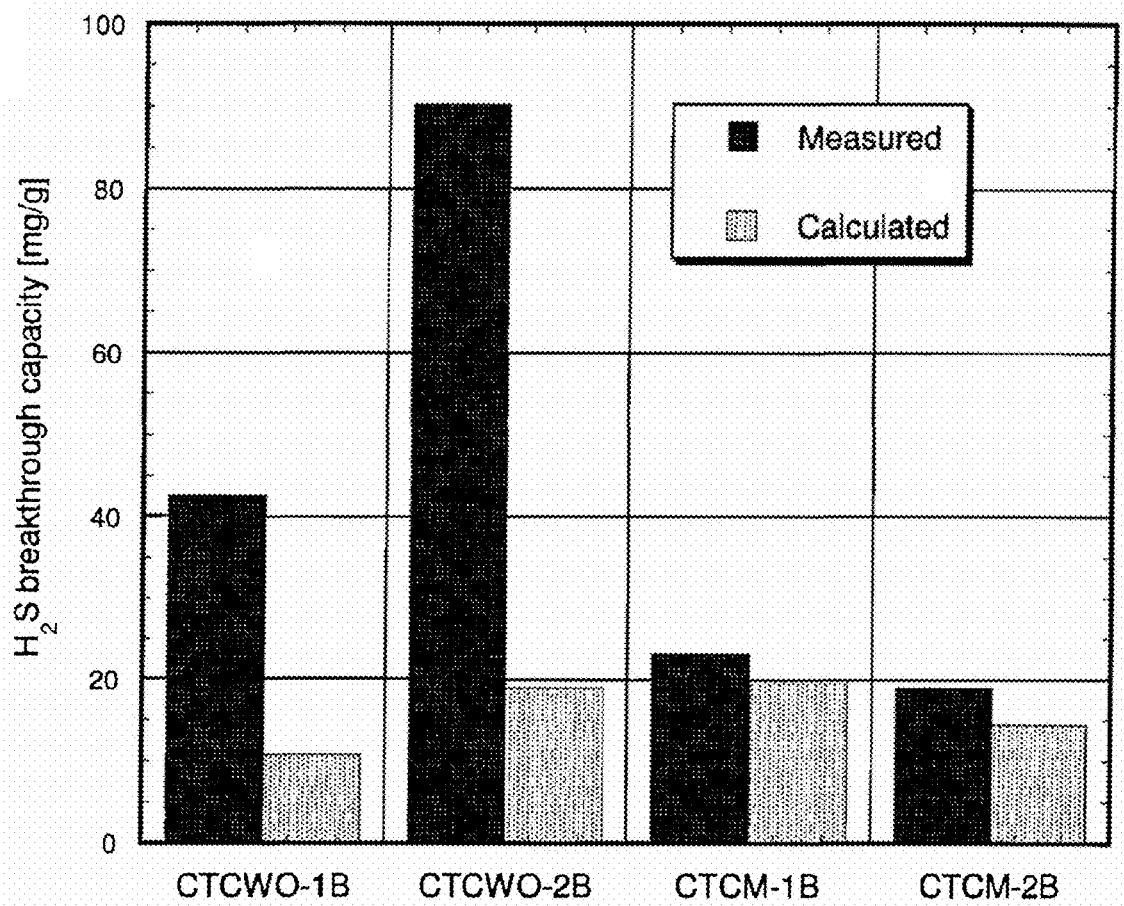
FIG. 16 illustrates a comparison of measured and calculated (assuming the physical mixture of components) $H_2S$ breakthrough capacities.

Checking the synergetic effect on the $H_2S$ breakthrough capacity, the measured values were compared to those calculated assuming the physical mixtures of the components, and taking into account their yields. The results presented in FIG. 16. While in the case of metal sludge only slight enhancement in the capacity is observed as a result of mixing, for the waste oil sludge/tobacco composites a significant synergetic effect is found with four fold increase in the capacity for CTCWO-2B.

That synergetic effect might be the result of either new catalytic phases formed when the materials are mixed and exposed to high temperature, formation of new pores enhancing physical adsorption and storage of oxidation products, an increased dispersion of catalytic phase, or more likely, the combination of all of these factors.

Figure 17:
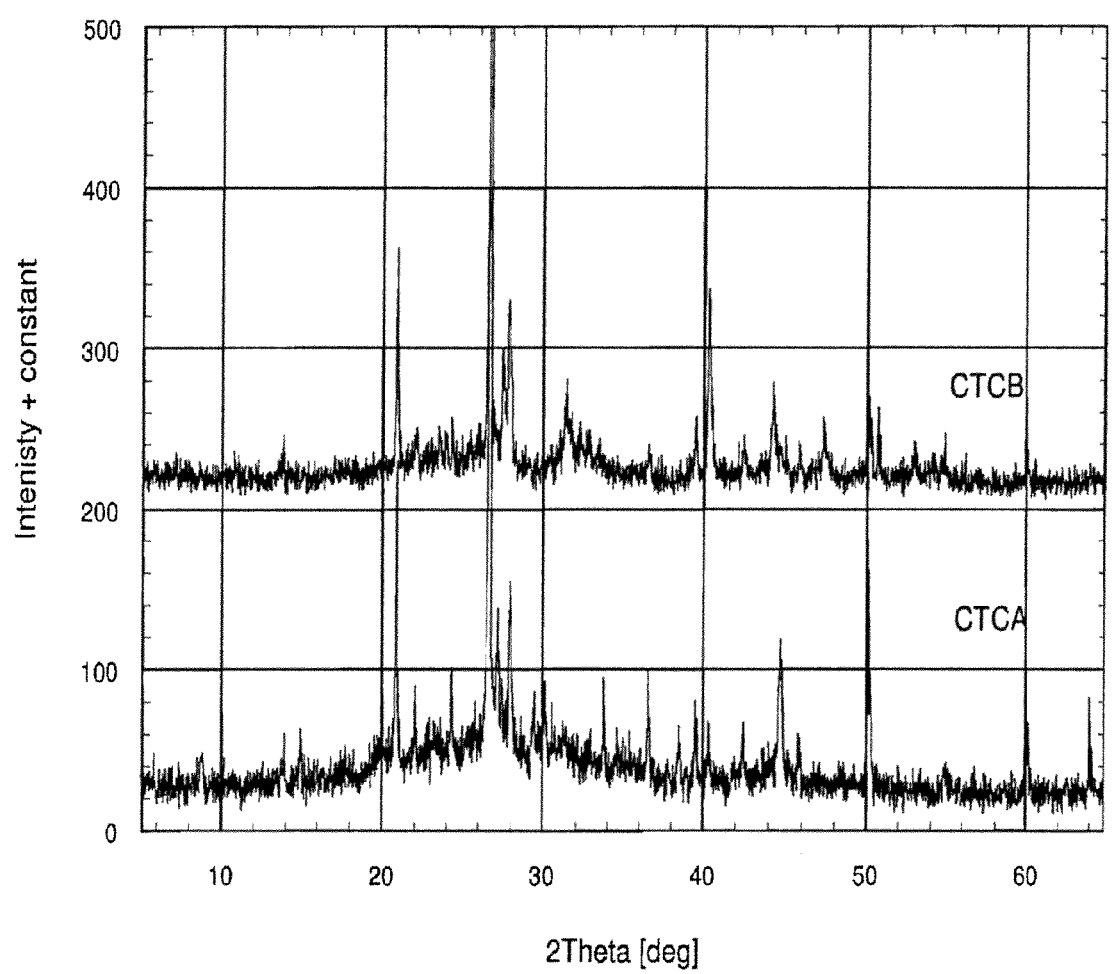
FIG. 17 illustrates XRD patterns for tobacco derived samples.
Figure 18:
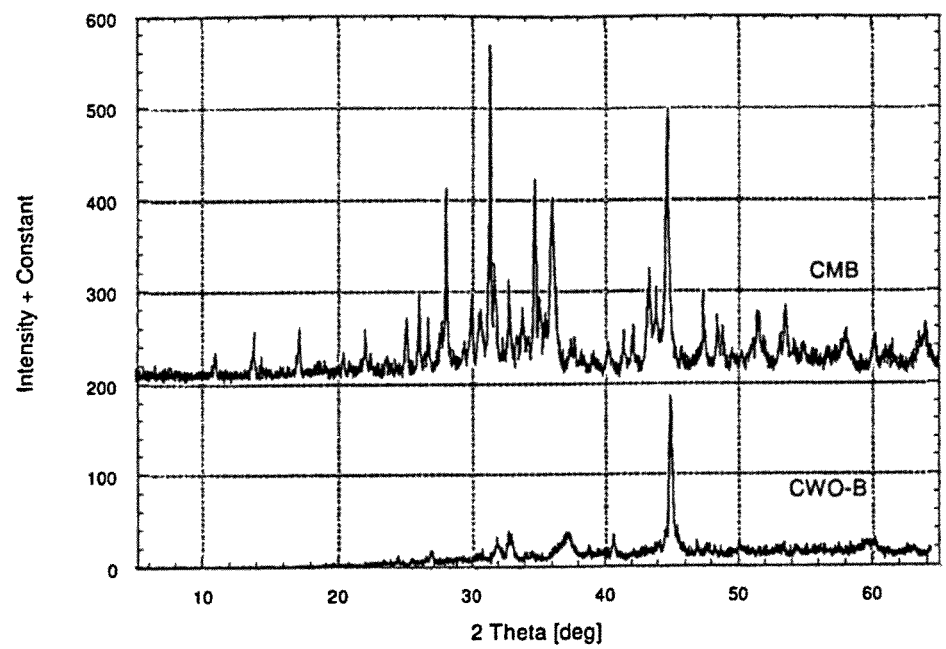
FIG. 18 illustrates XRD patterns for metal and waste oil sludge derived adsorbents.

Using X-ray diffraction one may see both, the changes in the degree of crystallinity of the adsorbents and the formation of new phases as a result of solid state reaction. FIG. 17 shows the comparison of XRD patterns for CTC adsorbents obtained at 650 and 950° C. As seen from the analysis of the ash content (Table 23) all adsorbents, even those derived from only tobacco waste have the majority of the inorganic phase. In the case of CTCA only quartz, and magnesian of ferrosilite ((Fe,Mg)SiO$_3$) are identified. Heating at 950° C. results in formation of more crystalline phases identified as bayerite $(Al(OH)_3)$, ordered anorthite $(CaAl_2Si_2O_8)$, anthophyllite $((Mg, Fe)_7Si_8O_{22}(OH)_2)$, and barrigerite $(Fe_2P)$. Some of these minerals such as barrigerite, were also identified in sewage sludge derived materials in which enhanced $H_2S$ adsorption was found. Magnesium, calcium and iron from these minerals can contribute to catalytic oxidation of hydrogen sulfide to sulfur. In the case of CWOB metallic iron, bornite $(Cu_5FeS_4)$, hibonite $(CaAl_{12}O_{19})$, zincite (ZnO) and ankerite $(Ca(Fe\ Mg)(CO_3)_2)$ are detected (FIG. 18). Heating metal sludge to 950° C. resulted in formation of numerous crystalline phases (multipeak pattern) from which pyrrohotite $(Fe_{1-x}S)$, troilite (FeS), pyrope $(Mg_3Al_2(SiO_4)_3)$, and metallic copper, zinc and iron have high probability to exist.

A multipeak pattern is also observed for the mixtures of tobacco with metal sludge of various compositions and pyrolyzed at two different temperatures. Comparison of FIGS. 17, 18 and 19 clearly shows that new phases are detected. Examples of these new phases for CTCM-1A are spinel $(MgAl_2O_4)$, margarite $(CaAl_2(Si_2Al_2)O_{10}(OH)_2)$, malachite $(Cu_2CO_3(OH)_2$, calcite $(CaCO_3)$, cordierite $(Mg_2Al_4Si_5O_{18})$, pigeonite $(Fe,Mg,\ Ca)SiO_3)$, corundum $(Al_2O_3)$, tenorite (CuO), magnesioferrite $(MgFe_2O_4)$, moissanite (SiC) and metallic iron. By pyrolyzing at 950° C., the mixture containing more metal sludge derived phase results in even more complex chemistry with predominant structures of mixed calcium iron and magnesium silicates and aluminosilicates. Some of them, as ferrocilite, anorthite were present in CTC-A. Examples are fosterite $(Mg_2SiO_4)$, huntite $(Mg_3Ca(CO_3)_4)$, aragonite $(CaCO_3)$, wollastonite $(CaSiO_3)$, dolomite $(CaMg(CO_3)_2)$, cohenite, $(Fe_3C)$ fersilicite (FeSi), covelite (CuS), bornite $(Cu_5FeS_4)$, grunerite $(Fe_7Si_8O_{22}(OH)_2)$, hardystonite $(Ca_2ZnSi_2O_7)$ or akermanite $(Ca_2MgSi_2O_7)$. In this case, compared to the sample pyrolized at 650° C., more carbonates are present, likely the result of gasification of carbon, less aluminum is involved in crystalline phase, and more two element-compounds appear.

Figure 19:
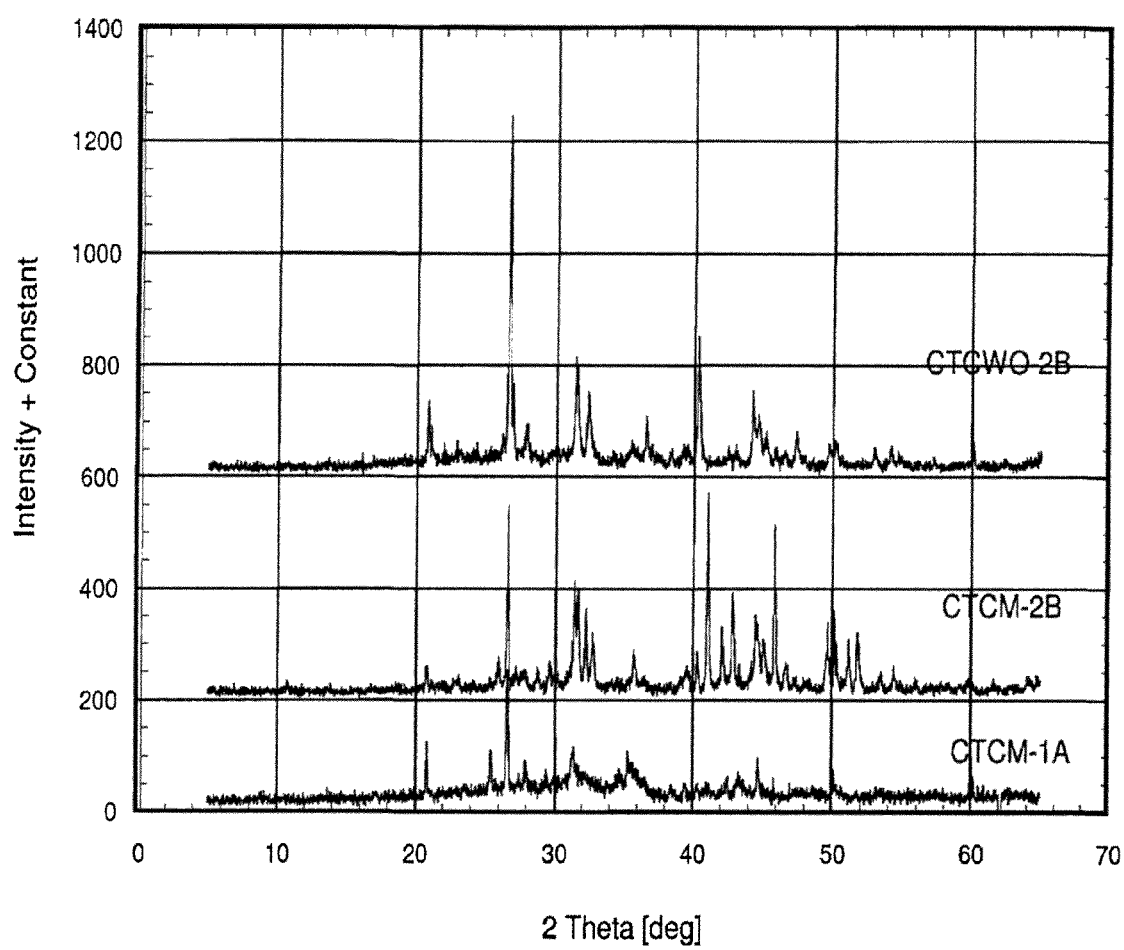
FIG. 19 illustrate a XRD diffraction pattern for composite tobacco/metal sludge based adsorbents.

Very complex and different form parent compound structure is obtained for CTCWO-2B (FIG. 19). In this case, besides significant amount of quartz, over 50 new compounds were detected. They are mainly aluminoslicate with magnesium, calcium, iron, sodium, copper and lead. Examples include: sodian of anorthite $((Ca, Na)\ (Al, Si)_2Si_2O_8)$, forsterite $(Mg_2SiO_4)$, albite $(CaAl_2Si_2O_8)$, richterite $(KNaCaMg_5Si_8O_{22}(OH)_2)$, renhahnite $(Ca_3(Si_3O_8(OH)_2)$, Dahlite $(Ca_{9.35}Na_{1.07}(PO_4)_{5.46}CO_3)$, rockbridgeite $(Fe_5(PO_4)_3(OH)_5)$.

Figure 20:
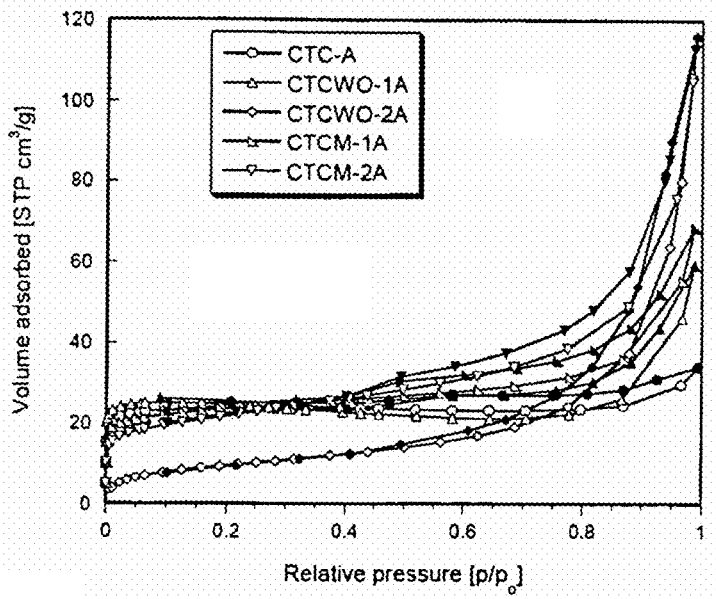
FIG. 20 illustrates nitrogen adsorption isotherms for samples pyrolyzed at 650° C.
Figure 21:
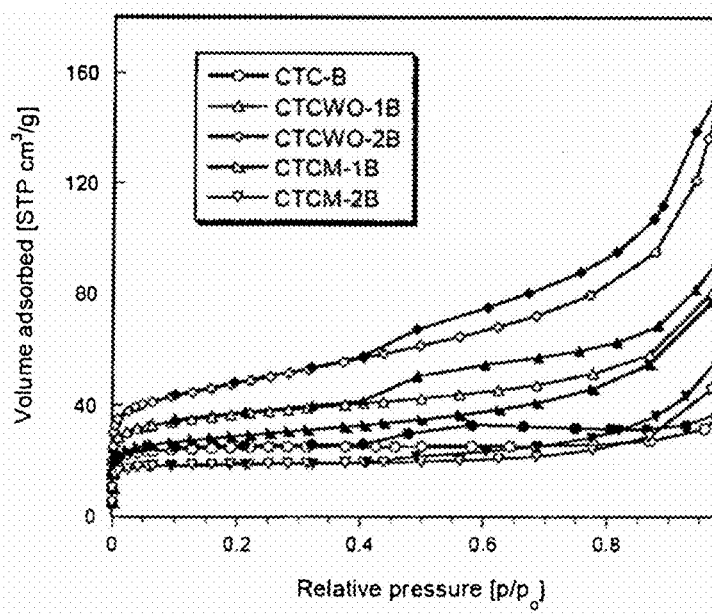
FIG. 21 illustrates nitrogen adsorption isotherms for samples pyrolyzed at 950° C.

Although surface chemistry can play a crucial role in the process of hydrogen sulfide oxidation on the surface of materials studied, its effects cannot be discussed in isolation from the description of porous structure. The nitrogen adsorption isotherms are collected in FIGS. 20 and 21. Their shapes and nitrogen uptakes indicate differences in the sizes and volume of pores. While tobacco derived adsorbents are both very microporous, addition of waste oil sludge and metals sludge component contributes to the development of mesoporosity. The structural parameters calculated from nitrogen adsorption isotherms are collected in Table 25. Either waste oil sludge or metal sludge addition increase the surface areas of samples obtained at 950° C. in spite of the fact that the surface areas of both components pysolyzed separately are much smaller. This indicates the beneficial synergetic effect. That development of porosity can be caused by gasification of carbon phase by alkaline earth metals present in the sludges, which can be considered as self-activation. Adding more waste oil sludge increases surface area, volume of micropores and volume of mesopores. Although the latter are present in much higher volume in the CWOB adsorbent, the new volume of micropores is the result of activation during pyrolysis. On the other hand, addition of metal sludge, even in only small quantity seems to be most beneficial for tobacco/metal sludge mixtures. These materials have a new volume of mesopores formed, which do not exist in either tobacco or metal sludge only based materials. Gasification can be important here. Much more alkaline earth metals than in waste oil sludge results (Table 26) in formation of larger pores in the carbonaceous deposit. It is interesting that the smallest surface area and pore volume are obtained for metal sludge tobacco mixture with 50/50 ratio of composition pyrolyzed at 650° C. This is consistent with this sample low capacity for hydrogen sulfide removal. Since both tobacco derived samples have almost identical structural parameters the differences in their performance as hydrogen sulfide adsorbents must be attributed to differences in surface chemistry mentioned above.

TABLE 25

Structural parameters calculated from nitrogen adsorption (Reference 1 is a sample ratio of 90:10; reference 2 is a sample ratio of 50:50, Reference A denotes pyrolysis at 650° C., and Reference B denotes pyrolysis at 950° C. E—exposure to $H_2S$

| Sample | $S_{BET}$ [m²/g] | $V_{mic}$ [cm³/g] | $V_{meso}$ [m²/g] | $V_t$ [cm³/g] | $V_{mic}/V_t$ | $D_{BJH}$ [Å] | $D_{DA}$ [Å] | $E_o$ [kJ/mol] |
|---|---|---|---|---|---|---|---|---|
| CTCA | 73 | 0.037 | 0.016 | 0.053 | 0.698 | 69 | 15 | 25.06 |
| CTCAE | 0 | 0 | 0 | 0 | 0 | 0 | 0 | 0 |
| CTCB | 78 | 0.039 | 0.020 | 0.059 | 0.661 | 41 | 16 | 21.82 |
| CTCB-E | 42 | 0.017 | 0.039 | 0.056 | 0.304 | 44 | 17 | 19.28 |
| CTCWO-1A | 71 | 0.041 | 0.051 | 0.092 | 0.446 | 95 | 16 | 23.80 |
| CTCWO-1AE | 33 | 0.014 | 0.088 | 0.102 | 0.137 | 100 | 17 | 17.62 |
| CTCWO-2A | 35 | 0.015 | 0.165 | 0.180 | 0.083 | 123 | 21 | 10.09 |
| CTCWO-2AE | 13 | 0.009 | 0.127 | 0.136 | 0.066 | 144 | 21 | 9.61 |
| CTCWO-1B | 120 | 0.055 | 0.096 | 0.151 | 0.364 | 56 | 16 | 20.65 |
| CTCWO-1BE | 37 | 0.019 | 0.072 | 0.091 | 0.209 | 68 | 17 | 17.55 |
| CTCWO-2B | 162 | 0.069 | 0.180 | 0.249 | 0.277 | 61 | 17 | 20.01 |
| CTCWO-2BE | 59 | 0.026 | 0.163 | 0.189 | 0.138 | 85 | 18 | 15.45 |
| CTCM-1A | 77 | 0.035 | 0.071 | 0.106 | 0.330 | 63 | 15 | 23.94 |
| CTCM-1AE | 8 | 0.006 | 0.047 | 0.053 | 0.113 | 138 | 17 | 18.79 |
| CTCM-2A | 74 | 0.031 | 0.144 | 0.175 | 0.177 | 79 | 17 | 18.67 |
| CTCM-2AE | 24 | 0.013 | 0.115 | 0.128 | 0.102 | 124 | 18 | 16.36 |
| CTCM-1B | 96 | 0.043 | 0.113 | 0.156 | 0.276 | 62 | 16 | 20.53 |
| CTCM-1BE | 46 | 0.018 | 0.097 | 0.115 | 0.157 | 99 | 18 | 15.62 |
| CTCM-2B | 59 | 0.031 | 0.061 | 0.092 | 0.337 | 82 | 16 | 20.19 |
| CTCM-2BE | 49 | 0.022 | 0.109 | 0.131 | 0.168 | 107 | 18 | 16.67 |

After $H_2S$ removal the surface area and volumes of micropores significantly decrease. For the majority of samples, but CTC-BE, CTCWO-1AE and CTCM-2BE the volume of mesopores increases. This phenomenon was observed before and was attributed to formation of new pores within either sulfur deposit in large pores, if capacity was high, or/and formation of hydroxides on the surface as a result of exposure to water during prehumidification. Although in the case of CTCM-2BE only small amount of water was adsorbed with relatively high amount of $H_2S$, taking into account the small surface area of the samples, a significant, almost 100% increase in the volume of mesopores can be attributed to that sulfur deposit. The surface in large pores of the materials must be active since extensive gasification helped in high dispersion on the catalysts on the surface. For CTCWO-1AE, that increase can be attributed to the formation of hydroxides, since the surface is active and large amounts of water are adsorbed, and also to sulfur deposit. These hydroxides can totally block the porosity in the carbon deposit when more sludge derived phase is present and sample is exposed to moisture from the atmosphere. This likely happens in the case of CTCWO-2A, which was totally inactive in the process of $H_2S$ adsorption, contrary to only waste oil sludge based sample whose capacity was found significant previously and it was attributed to the high volume of mesopores, which, owing to their large sizes, cannot be blocked by hydroxides. As seen from Table 25 the average pore sizes calculated using Dubinin-Astakhov method are related to the values of the characteristic energy of adsorption, which is the highest for CTC-A, CTCWO-1A, and CTCM-1A. These materials are obtained at low temperature so they can be considered as chars or "underactivated" carbons.

TABLE 26

Content of catalytic metals

| Sample | Fe [%] | Ca [%] | Mg [%] | Cu [%] | Zn [%] | Cr [ppm] |
|---|---|---|---|---|---|---|
| CWOB | 3.7 | 5.1 | 8.4 | 0.25 | 0.51 | 280 |
| CMB | 22 | 14 | 0.46 | 0.77 | 0.16 | 6700 |
| CTCB | $1.45 \times 10^{-4}$ | 0.0115 | 0.00255 | $1.55 \times 10^{-5}$ | $2 \times 10^{-5}$ | ND |

Figure 22:
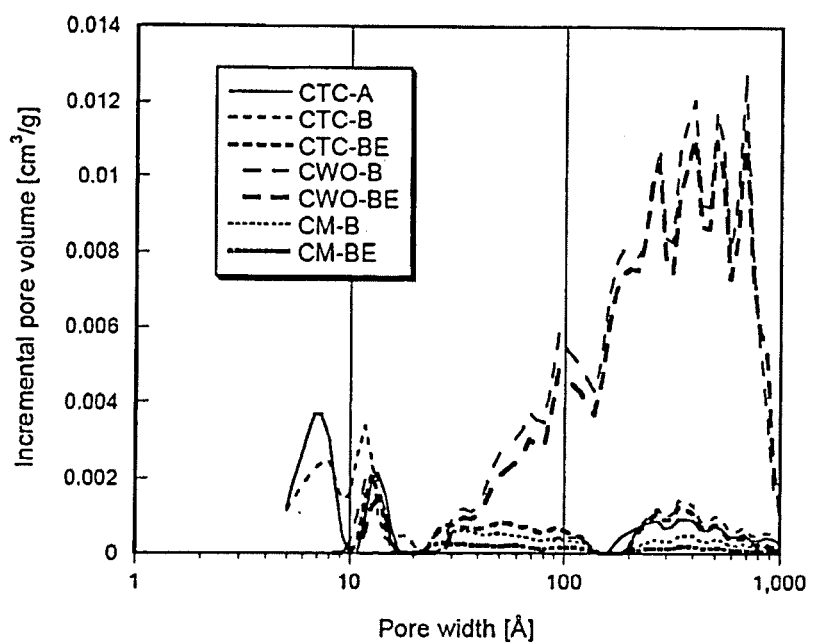
FIG. 22 illustrates pore size distributions for single component samples.
Figures 23A, 23B:
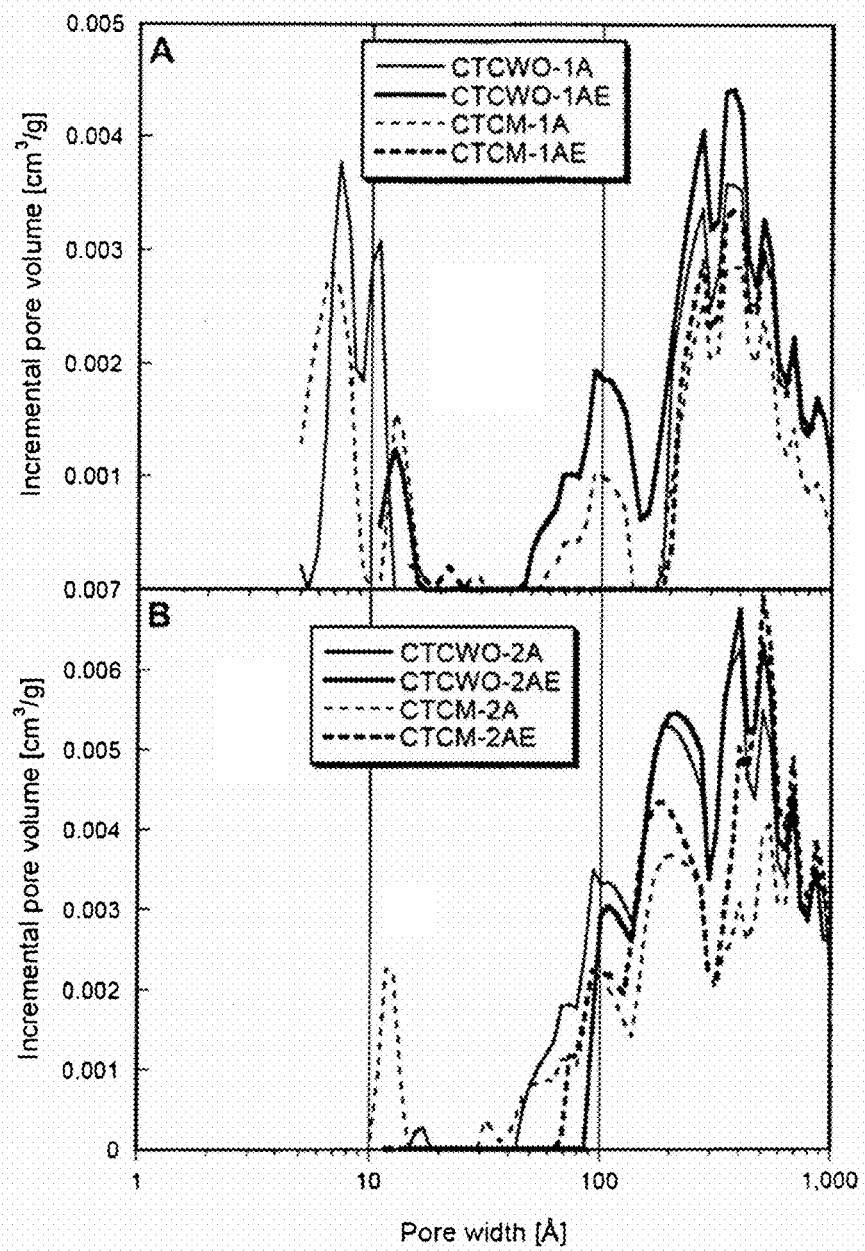
FIGS. 23A and 23B illustrate pore size distributions for samples pyrolyzed at 650° C.
Figures 24A, 24B:
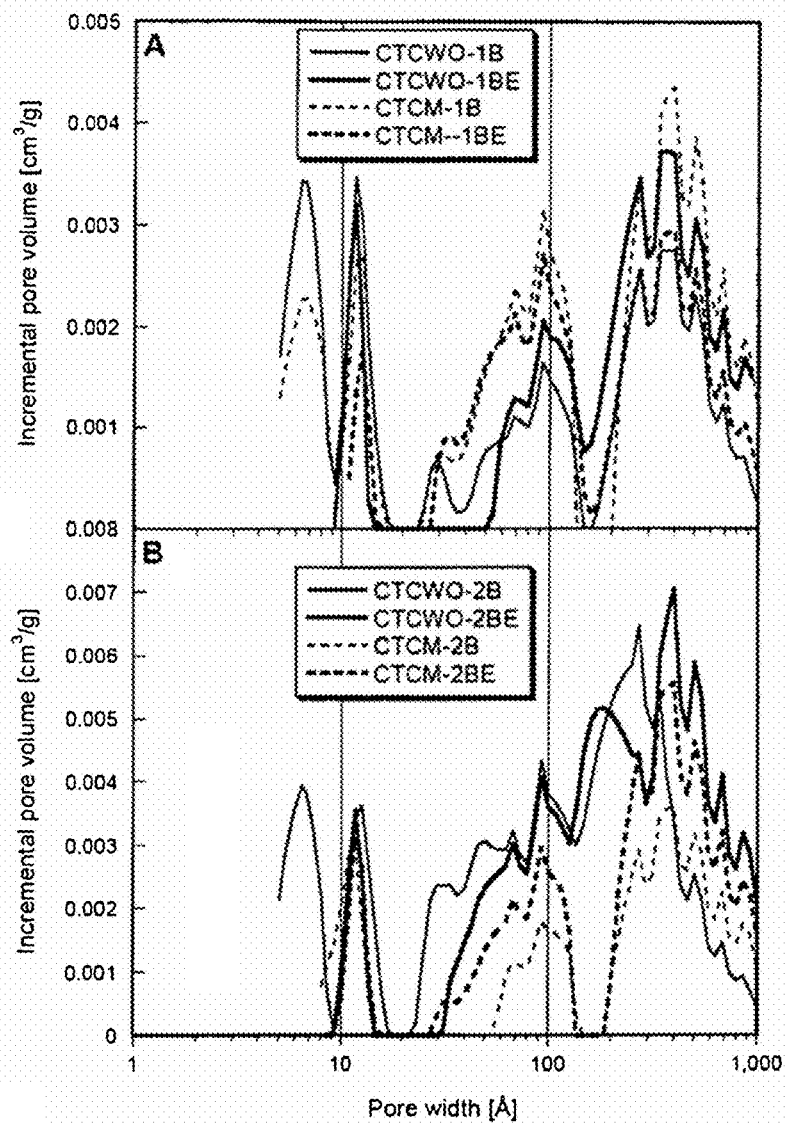
FIGS. 24A and 24B illustrate pore size distributions for samples pyrolyzed at 950° C.

Details about the differences in the porosity of our samples are presented in FIGS. 22, 23A & B and 24A & B as pore size distributions. For all samples on the distributions two regions can be seen. One consists of micropores which are much more heterogeneous in their sizes for CTC and CTWO series of samples than for CTCM. On the other hand, the heterogeneity of mesopores is much greater for the latter group of samples. After $H_2S$ adsorption the smallest pores are not seen anymore indicating that sulfur is deposited either there, or at their entrances, and the new pores appears, especially with the range of sizes between 50-200 Å. In same cases it happens with the expense of macropores. This shows importance of large porosity with catalytically active surface to the process of hydrogen sulfide oxidation. If only physical adsorption were predominant those pores would not play any role and would have a negative effect on the performance of materials based on the unit volume of the bed. Thus in the case of this groups of materials very light adsorbents can be used which may increase the cost effectiveness of the removal process.

Figure 25:
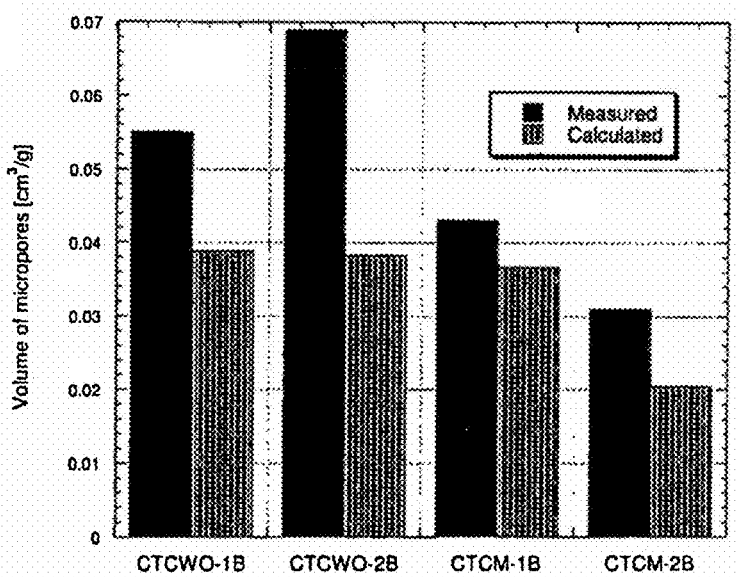
FIG. 25 shows a comparison of the volume of micropores measured and calculated assuming physical mixture of the components.
Figure 26:
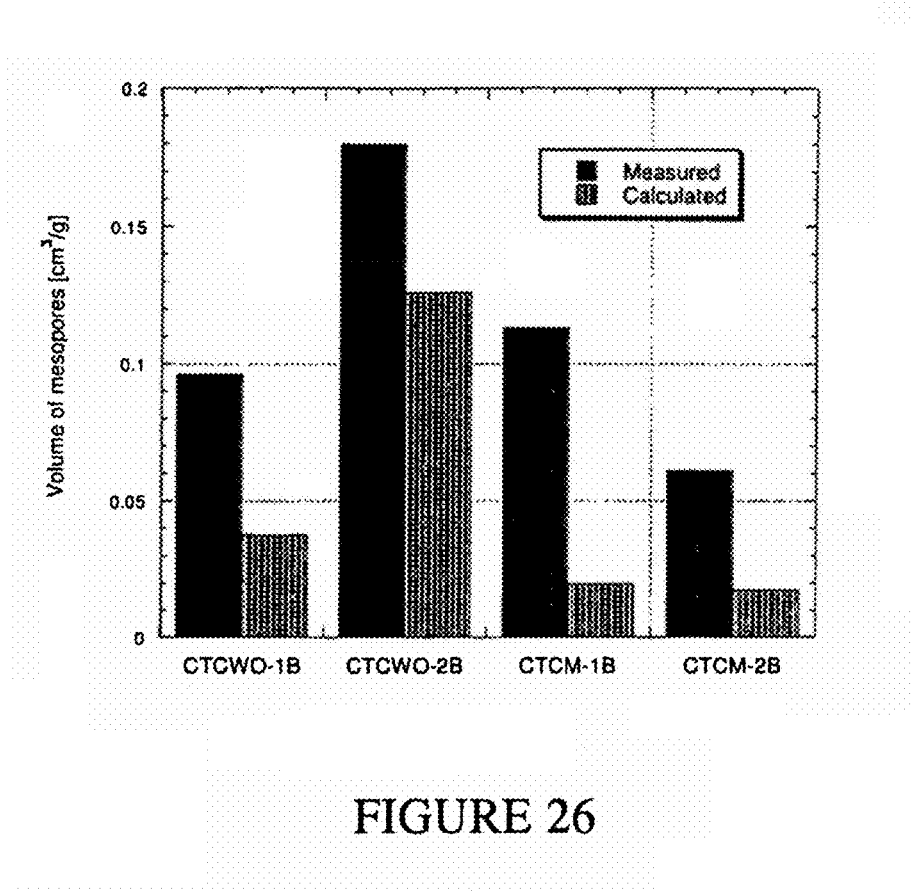
FIG. 26 shows a comparison of the volume of mesopores measured and calculated assuming physical mixture of the components.

The synergetic effect of the porosity development in our materials is presented in FIGS. 25 and 26 where the measured volumes of micro and mesopores are compared to those calculated assuming the physical mixture of the components and taking into account the yield of materials. As discussed above, the synergetic effects of the sludge components on activation of the final products is clearly seen with the most pronounced effects of waste oil sludge on the volume of micropores and metal sludge—on the volume of mesopores.

Figure 27:
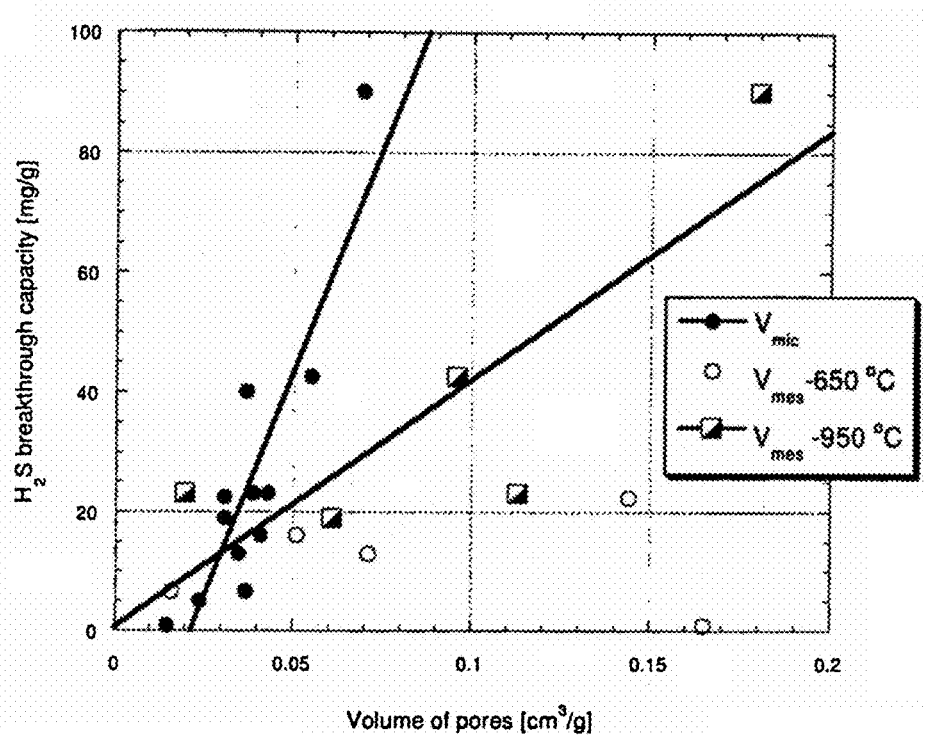
FIG. 27 illustrates the dependence of $H_2S$ breakthrough capacity on the volume of pores (micropores and mesopores for samples pyrolyzed at two temperatures)

To check the role of porosity for $H_2S$ adsorption, the dependence of the capacity on the volume of pores was analyzed. The results are presented in FIG. 27. As seen, a good relationship is found for the volume of micropores. They have they origin likely in the tobacco derived carbon phase thus this component of the $H_2S$ adsorption process has to have similar mechanism on all tobacco containing samples. Linear trend is also noticed for the volume of mesopores but only for materials obtained at 950° C. As it was shown above, water has a detrimental effect on the chemistry of low temperature pyrolyzed samples, thus the linear trend in his case is not expected. The linear relationship between the capacity and volume of mesopores indicates the activity of large pores in the process of hydrogen sulfide catalytic oxidation.

Figure 28:
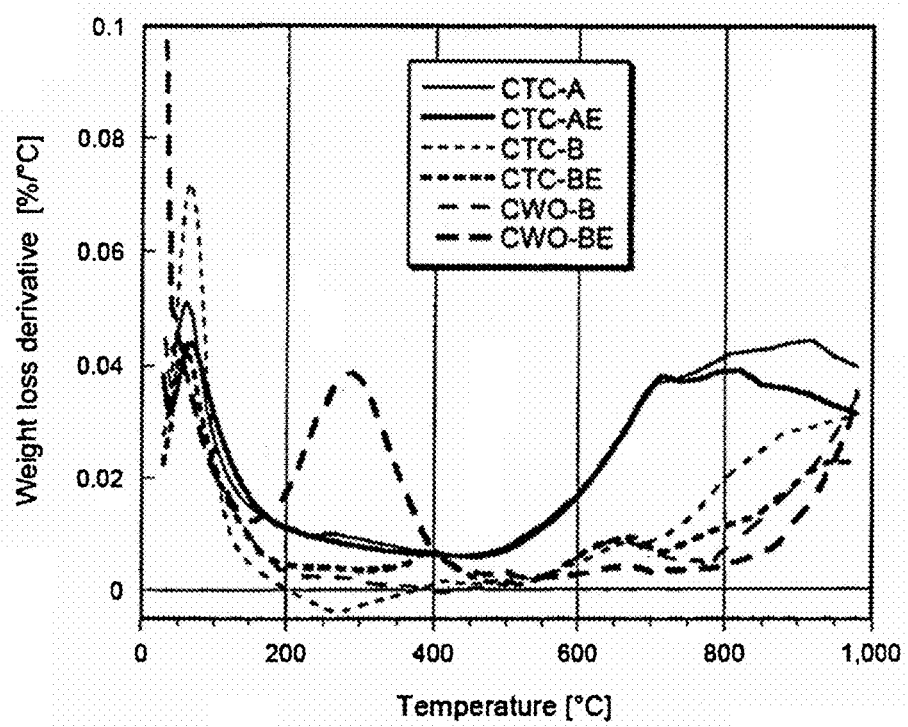
FIG. 28 illustrates DTG curves in nitrogen for single component samples.
Figures 29A, 29B:
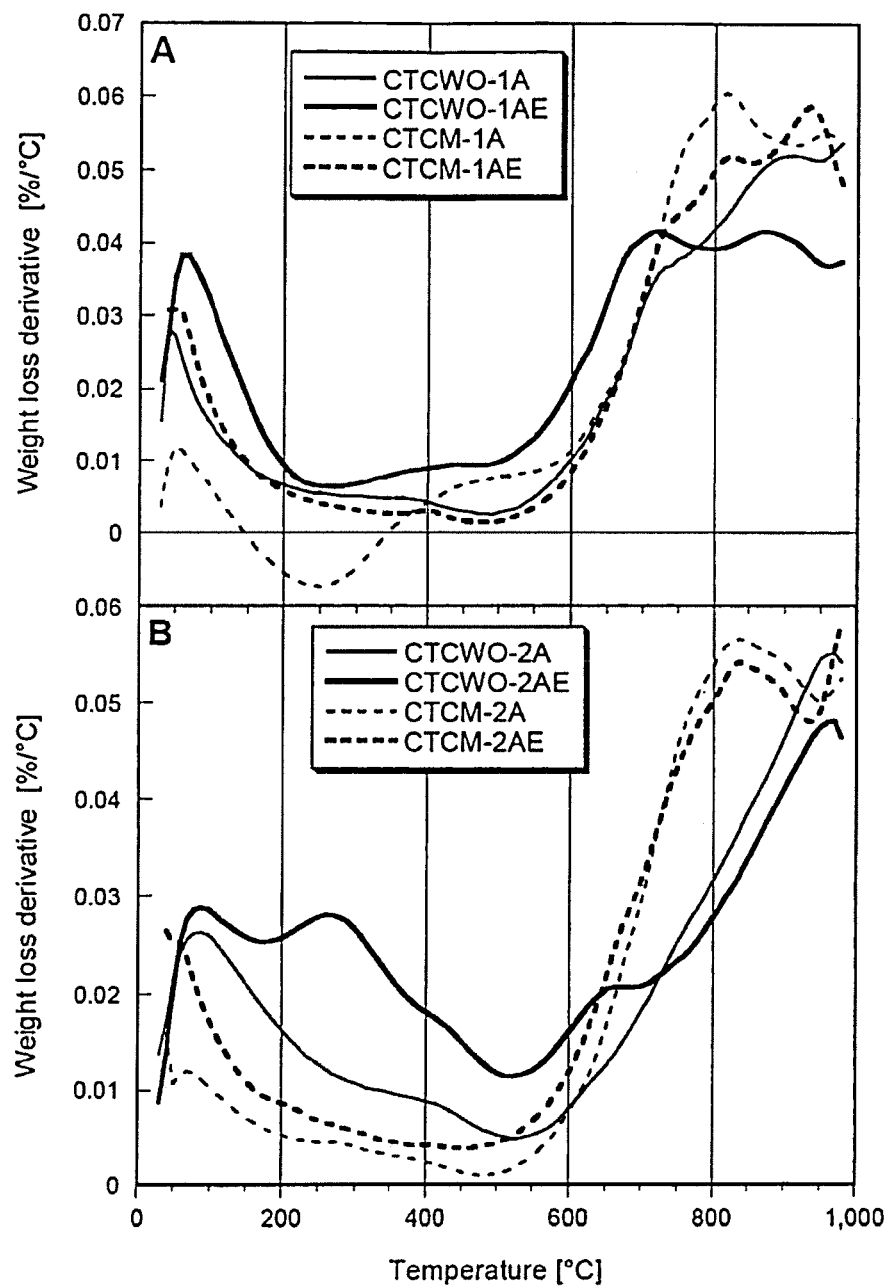
FIGS. 29A and 29B illustrate DTG curves in nitrogen for samples pyrolyzed at 650° C.
Figures 30A, 30B:
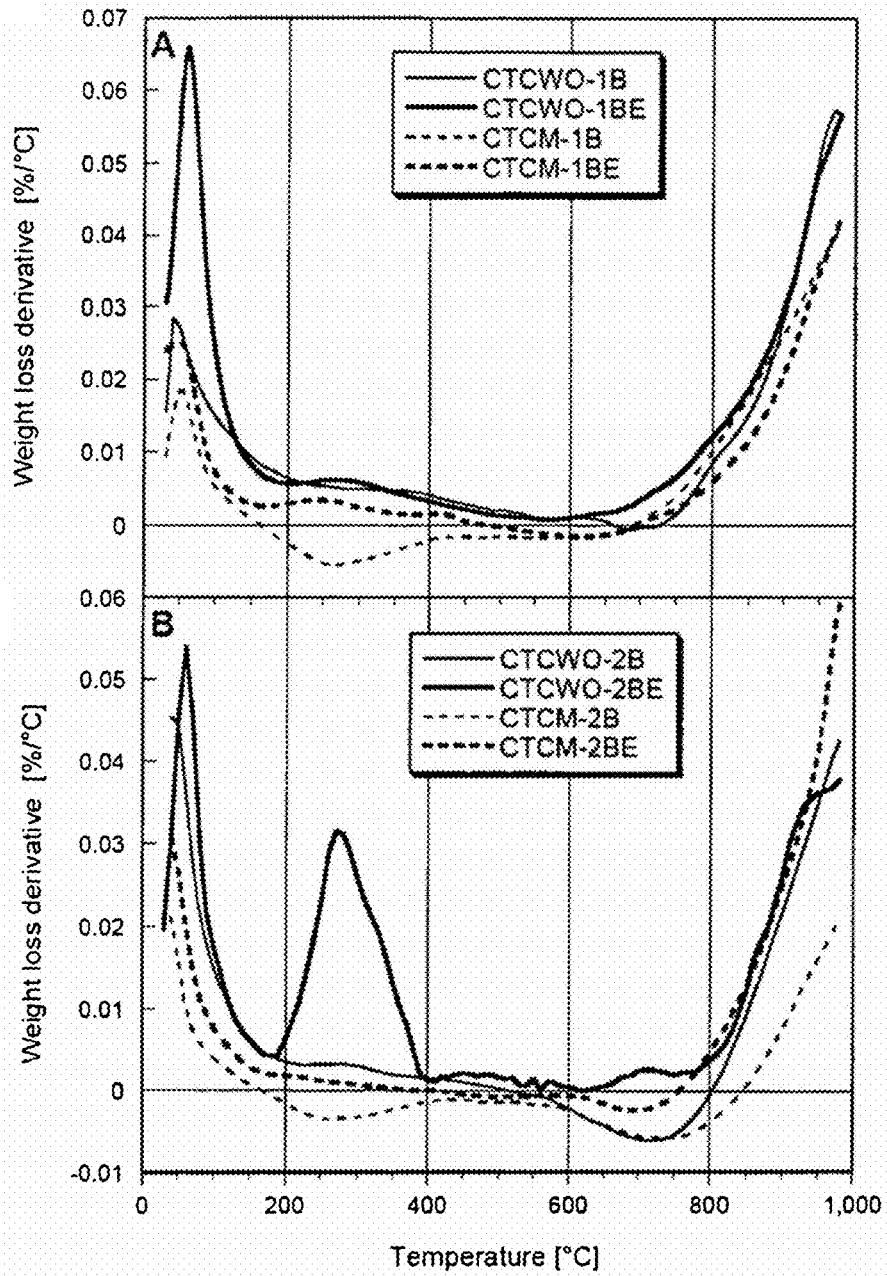
FIGS. 30A and 30B illustrate DTG curves in nitrogen for samples pyrolyzed at 950° C.

The comparison of DTG curves before and after adsorption of hydrogen sulfide is presented in FIGS. 28, 29, and 30. The peaks on the curves represent weight loss due to the decomposition/desorption of surface species. For some initial samples as CTCB, CTCM-1A, CTCM-1B an increase in weight (negative peaks) is observed between 150 and 400° C. and between 600 and 800° C. The latter negative peak is also found for CTCWO-2B. This strange behavior was noticed previously for some metal sludge, waste oil sludge and even sewage sludge-based adsorbents. Since only nitrogen was present formation of nitrides was given as the only plausible explanation. After $H_2S$ adsorption a negative peak is present only at high temperature range for CTCM-2BE. For other samples it is compensated by weight loss caused by removal of deposited sulfur between 200-400° C. Although this weight loss/peak intensity should be proportional to the amount of hydrogen sulfide deposited on the surface in the case of material pyrolyzed at 650° C. addition to the weight loss occurs as a result of dehydroxylation of surface at temperature smaller than 600° C. The hydroxides were formed when samples were exposed to water during prehumidification and $H_2S$ adsorption.

Pyrolysis of waste tobacco compost and industrial sludges from heavy industries leads to the development of effective catalyst for desulfurization of air. An important role of carbonaceous phase derived from waste tobacco is in its relatively high carbon content. That carbon contributes to the development of porosity in both, micro and mesopore ranges. This happens via self-activation of carbon material by alkaline earth metals and water released from the decomposition of inorganic matter during heat treatment. As a result of solid state reactions at high temperature new catalytic species are formed on the surface of adsorbent as a result of synergy between the components of sludges. Location of these species in mesopores is beneficial for the desulfurization process. The surface of those pores retain water film where hydrogen sulfide can dissociate in the basic environment, Sulfur formed in oxidation reaction can be stored there in large quantity without rapid deactivation of the catalytic centers by sterical hindrances. High temperature of pyrolysis is beneficial for the adsorbents due to the enhanced activation of carbonaceous phase and chemical stabilization of inorganic phase. Samples obtained at low temperature are sensitive to water, which deactivates their catalytic centers.

Example 11

A blend of 90% tobacco waste (TC) and 10% waste oil sludge (WO) were blended and in one embodiment, a ribbon blender was used to blend the TC with WO. The TCWO-RD mixture was dried in two stages. The first stage dried the mixture from approximately 76% moisture to approximately 55% moisture and the second stage reduced the approximate moisture to 32%. In an embodiment, the drying was performed in direct fired rotary dryer. In this embodiment, the inlet temperature of the dryer during stages one and two was 385° C. while the outlet temperature for both stages was 232° C. The rotary dryer settings for the particular embodiment are below in Table 27.

TABLE 27

Dryer Data

| Property | Units | TCWO-RD Stage 1 | Stage 2 |
|---|---|---|---|
| Wet Feed Rate | lb/hr | 120 | 240 |
| Wet Feed Moisture | wt % | 76 | 55 |
| Wet Product Moisture | wt % | 55 | 32 |
| Drying Gas Inlet Temp | Deg F. | 725 | 725 |
| Drying Gas Outlet Temp | Deg F. | 450 | 450 |
| Exhaust Gas Rate | lb/hr | 1,453 | 1,295 |
| Exhaust Gas Rate | scfm | 323 | 292 |

Figure 31:
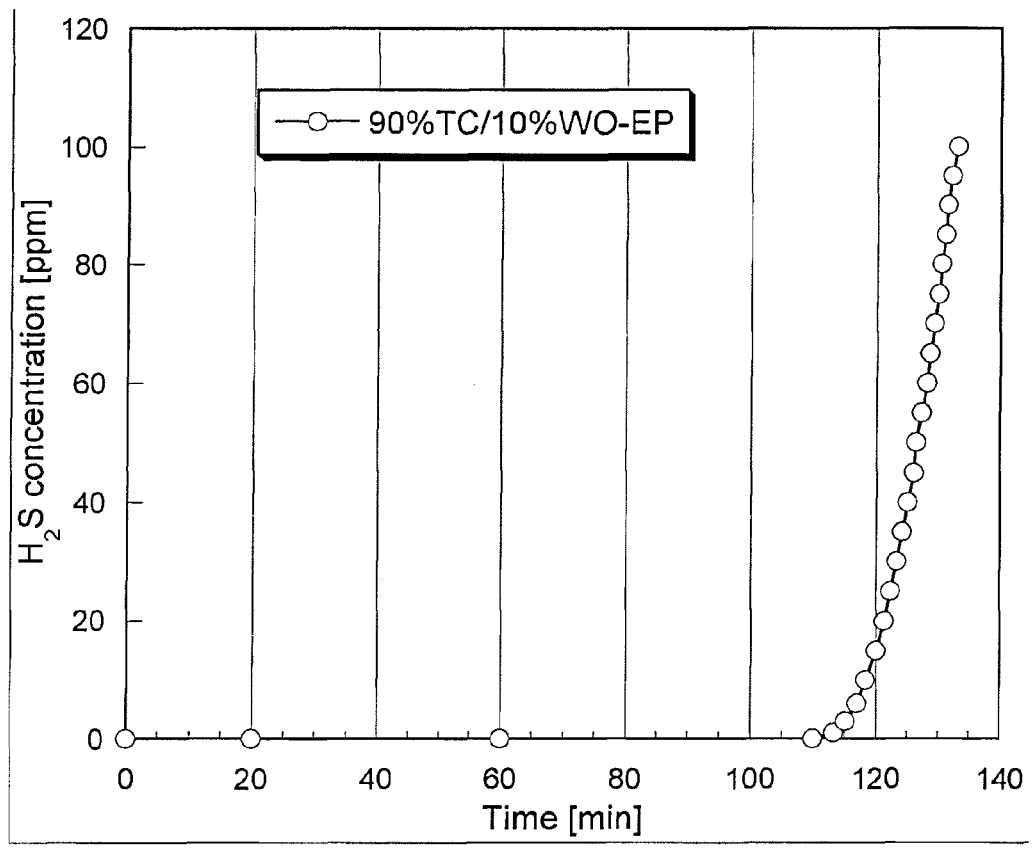
FIG. 31 illustrates the $H_2S$ breakthrough curve for adsorbents formed from TCWO-RD.

The dried TCWO-RD mixture was pyrolyzed in a rotary kiln calciner (see FIG. 31) having four (4) independent heating zones each independent zone was set to a different temperature. The changing temperature zones facilitated the pyrolyzing of the TCWO-RD mixture to form the structures noted above and actually improve certain adsorbent characteristics. The temperature zone of the rotating kiln was set to the values in Table 28.

TABLE 28

Rotary Kiln Temperature:

| Zone | Temperature (° C.) |
|---|---|
| 1 | 632 |
| 2 | 816 |
| 3 | 932 |
| 4 | 1010 |

The rotary kiln of the present embodiment had a rotary shell size of 7¼" O.D. by 6½" I.D. by 11'-3" overall length, including a 6'-8" long heating section and 3'-0" long cooling section. The shell was constructed of centrifugally cast type HH alloy. Heat was applied indirectly via radiation and conduction by a 54 kW electric furnace having four (4) independent zones of temperature control. The material was fed to the furnace via a screw feeder.

Table 29 outlines the rotary kiln setting for this embodiment.

TABLE 29

Furnace Data:

| Property | Units | TCWO |
|---|---|---|
| Wet Feed Rate | lb/hr | 39 |
| Wet Feed Moisture | wt % | 32 |
| Wet Product Moisture | wt % | Nil |
| Zone 1 Shell Temp | Deg F. | 1,170 |
| Zone 2 Shell Temp | Deg F. | 1,500 |
| Zone 3 Shell Temp | Deg F. | 1,710 |
| Zone 4 Shell Temp | Deg F. | 1,850 |
| Furnace Product Temp | Deg F. | 1,772 |
| Offgas Rate | lb/hr | 87.9 |

TABLE 29-continued

Furnace Data:

| Property | Units | TCWO |
|---|---|---|
| Exhaust Gas Rate | acfm | 44.7 |
| Product Density | lb/ft³ | 32.7 |
| Condensate Generation | lb | 37.7 |
| Material Processed | lb | 195 |

In this embodiment, lab tests were performed for the pH of the carbon surface, thermal analysis and ash/carbon content, and surface area and porosity. A pH of the carbon surface before and after $H_2S$ was evaluated. A 0.4 g of adsorbent was placed in 20 mL of distilled water. After overnight equilibration, the pH of the suspension was measured. Thermal analysis was carried out using TA Instrument Thermal Analyzer. The instrument settings were: heating rate 10° C./min and a nitrogen atmosphere with 100 mL/min flow rate. For each measurement about 25 mg of a ground adsorbent sample were used. From the weight loss curve the weight loss derivative curve (DTG) was calculated where areas under peaks represent the weight loss. Bed density of carbons was evaluated from the volume of the adsorbent bed used for $H_2S$ breakthrough capacity measurements and the weight of the adsorbent in the column. Surface area and porosity testing was performed on the materials obtained sorption of nitrogen at its boiling point was carried out using ASAP 2010 (Micromeritics). Before the experiments, the samples were outgassed at 120° C. (the exhausted samples were outgassed at 100° C. to minimized vaporization of elemental sulfur and weakly bonded sulfuric acid) to constant vacuum ($10^{-4}$ torr). From the isotherms, the surface areas (BET method), total pore volumes, Vt, (from the last point of isotherm at relative pressure equal to 0.99), volumes of micropores, Vmic (DR), mesopore volume Vmes, along with pore size distributions were calculated.

Analyzing the data, the results were compared to those obtained from similar composition noted by CTCWO-1B (see Example 10). The breakthrough capacity is presented in Table 30 and the breakthrough curve in FIG. 31. The breakthrough curve is steep, indicating fast kinetics of the adsorption/oxidation. As seen form the table, the TCWO-RD has higher capacity for hydrogen sulfide removal than the sample obtained previously at CTCWO-1B. The reason for this is higher pH owing to higher content of inorganic matter/less carbon and thus higher affinity to retain water. The differences in the performance between the lab test and ASTM test are related to the conditions of the process (concentration of $H_2S$).

Table 30 illustrates the $H_2S$ breakthrough capacity result at 3,000 ppm from air, flow rate 500 mL/min.

TABLE 30

$H_2S$ breakthrough capacity result.

| Sample | $H_2S$ Breakthrough capacity (mg/g of ads) | $H_2S$ Breakthrough capacity (mg/cm³ of ads) | Water adsorbed (mg/g) | Ash content (%) | pH initial | pH exhausted |
|---|---|---|---|---|---|---|
| CTCWO-1B | 42.7 | 17 | 35.1 | 78 | 10.00 | 9.8 |
| TCWO-RD-EP | 93.8 | 47 | 58.2 | 81 | 11.87 | 11.22 |

Figure 32:
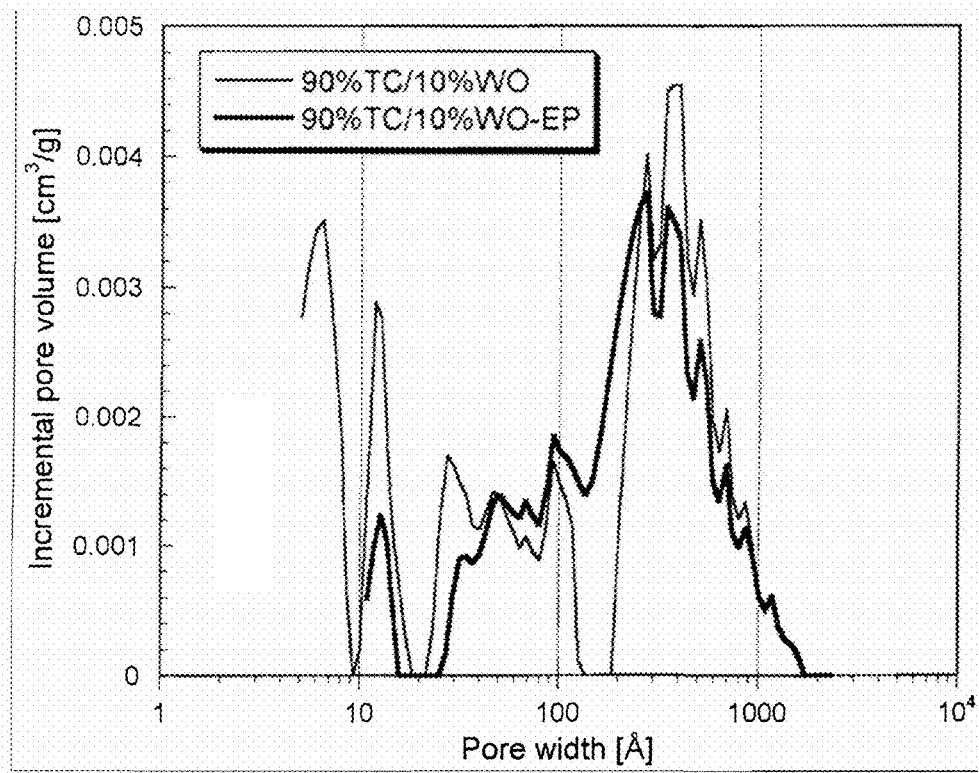
FIG. 32 illustrates the pore size distributions (PSD) for the TCWO-RD initial and exhausted samples.

The differences in the performance are related not only the surface chemistry but also to the porosity. The structural parameters are collected in Table 31. The sample addressed n this report differs in the structural parameters. All of them are greater than for the CTCWO-1B sample and the level of microporosity is lower. The 20% higher volumes of micro and mesopores likely contribute to better performance. After adsorption/oxidation the volume of micropores is affected to the greatest extent. Nevertheless some sulfur is deposited also in mesopores. The pore size distributions are presented in FIG. 32. As seen after adsorption the pores smaller than 10 Å practically disappear suggesting their filing by sulfur deposit. Sulfur is also deposited pores smaller than 40 Å.

TABLE 31

Structural Parameters Calculated from Nitrogen Adsorption Isotherms (exposed to H$_2$S gas with prehumidification (E or EP))

| Sample | $S_{BET}$ (m$^2$/g) | $V_{mic}$ (cm$^3$/g) | $V_{meso}$ (cm$^3$/g) | $V_t$ (cm$^3$/g) | $V_{mic}/V_t$ (%) |
|---|---|---|---|---|---|
| CTCWO-1B | 120 | 0.055 | 0.096 | 0.151 | 0.364 |
| CTCWO-1BE | 37 | 0.019 | 0.072 | 0.091 | 0.209 |
| TCWO-RD | 141 | 0.061 | 0.123 | 0.184 | 0.33 |
| TCWO-RD-EP | 43 | 0.016 | 0.109 | 0.125 | 0.13 |

Figure 33:
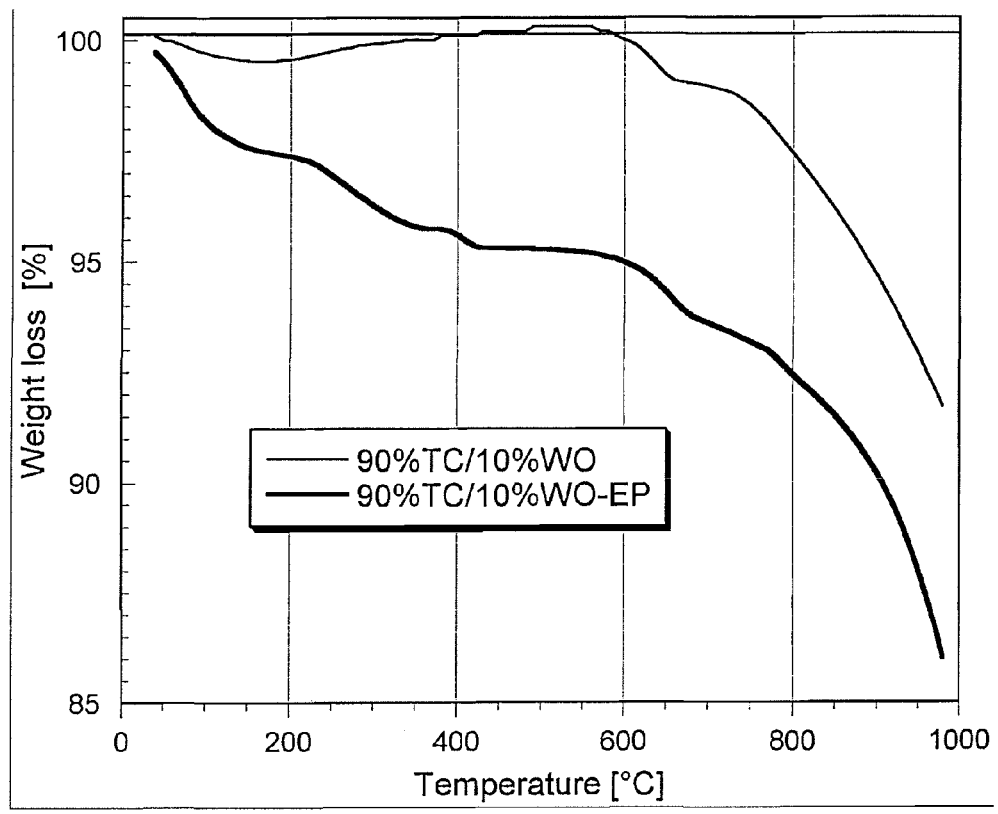
FIG. 33 illustrates the TG for the TCWO-RD initial sample and after exposed to $H_2S$ gas with prehumidification (EP)
Figure 34:
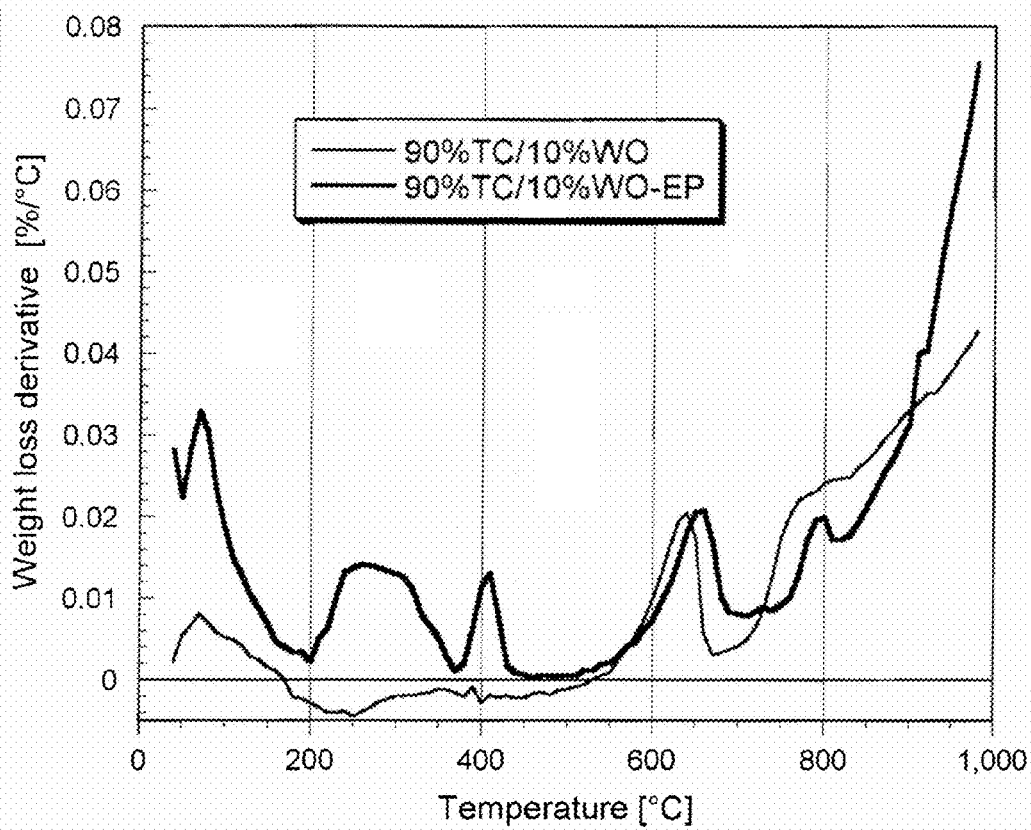
FIG. 34 illustrates DTG for the TCWO-RD initial sample and after exposed to $H_2S$ gas with prehumidification (EP)

The analysis of the surface chemistry the exhaustion was done using TA analysis. The TG and DTG curves in nitrogen are presented in FIGS. 33 and 34, respectively. The area under the peak on DTG curves represent the weight lost. Since the pH did not change significantly, the presence of elemental sulfur is expected 200-600° C. Indeed the weight loss for the B sample (ASTM) is about 7% and for the S sample (lab test) is about 3%. Although all sulfur is not accounted for, it shows the same trend as the capacity. The offset of the peak at temperature higher than 900° C. indicates that sulfur can be engaged also in sulfides. The trends for the CTCWO-1B sample are different and only one well defined sulfur peak was noticed. This can be related to the involvement of inorganic matter is of this sample in formation of sulfur salts such as sulfates and sulfites, besides sulfides. The over 40% yield in the case of CTCWO-1B and only 5% for TCWO-RD support the above reported observations that the conditions of the process affect the materials' performance.

The above tables illustrate the improvement of certain physical parameters as compared to the sample CTCWO-1B listed in Tables 23-25 above.

Further, a sewage sludge blend of 90% SS and 10% WO (SSWO-RD) was prepared similar to the TCWO-RD sample above. The sample preparation for both the rotary dryer and rotary kiln are below. As an initial parameter, the SSO-RD mixture was dried in two stages from 75% moisture to 65% and then a second stage down to 45% moisture.

TABLE 32

SSWO Dryer Data
SSWO-RD

| Property | Units | Stage 1 | Stage 2 |
|---|---|---|---|
| Wet Feed Rate | lb/hr | 275 | 300 |
| Wet Feed Moisture | wt % | 75 | 65 |
| Wet Product Moisture | wt % | 65 | 45 |
| Drying Gas Inlet Temp | Deg F. | 700 | 740 |
| Drying Gas Outlet Temp | Deg F. | 450 | 400 |
| Exhaust Gas Rate | lb/hr | 1,463 | 1,144 |
| Exhaust Gas Rate | scfm | 328 | 263 |
| Material Processed | lb | 839 | 514 |

TABLE 33

SSWO-RD Furnace Data

| Property | Units | SSWO |
|---|---|---|
| Wet Feed Rate | lb/hr | 44 |
| Wet Feed Moisture | wt % | 45 |
| Wet Product Moisture | wt % | Nil |
| Zone 1 Shell Temp | Deg F. | 1,100 |
| Zone 2 Shell Temp | Deg F. | 1,500 |
| Zone 3 Shell Temp | Deg F. | 1,710 |
| Zone 4 Shell Temp | Deg F. | 1,800 |
| Furnace Product Temp | Deg F. | 1,735 |
| Offgas Rate | lb/hr | 105.7 |
| Exhaust Gas Rate | acfm | 45.0 |
| Product Density | lb/ft$^3$ | 29.9 |
| Condensate Generation | lb | 46.4 |
| Material Processed | lb | 327 |

Mercury Evaluation

The adsorbent performance of the TCWO-RD mixture was tested on a wastewater sample with Mercury along with two sewage-sludge blends, and were evaluated against a sulfur-impregnated carbon material (Norit RBHG3). The two blends were laboratory-prepared samples. Blend 1 was 90% SS and 10% WO (SSWO) and blend 2 was 90% sewage sludge, 5% waste oil sludge and 5% metal sludge (SSWOMS).

Figure 35:
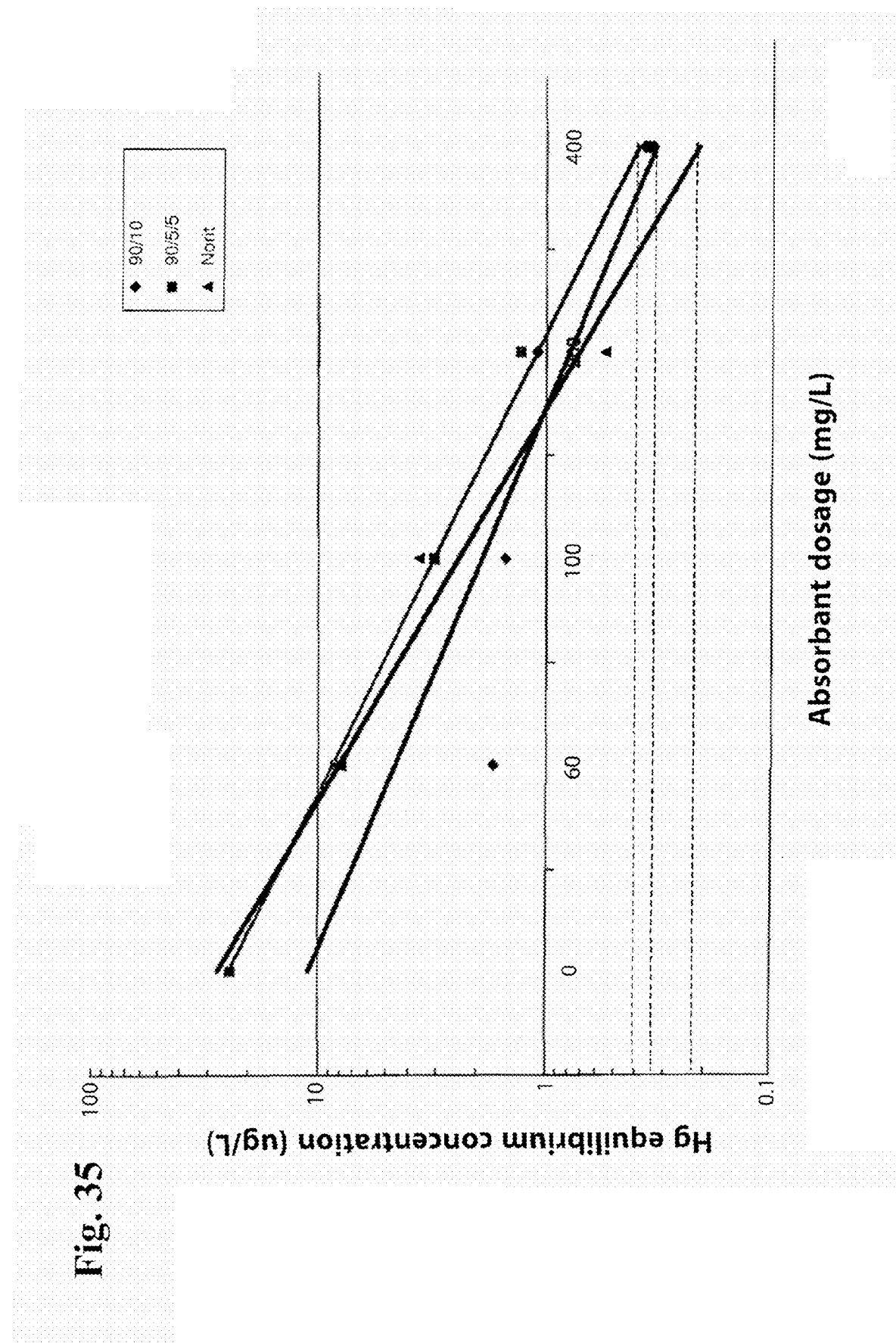
FIG. 35 illustrates mercury adsorption of known products.
Figure 36:
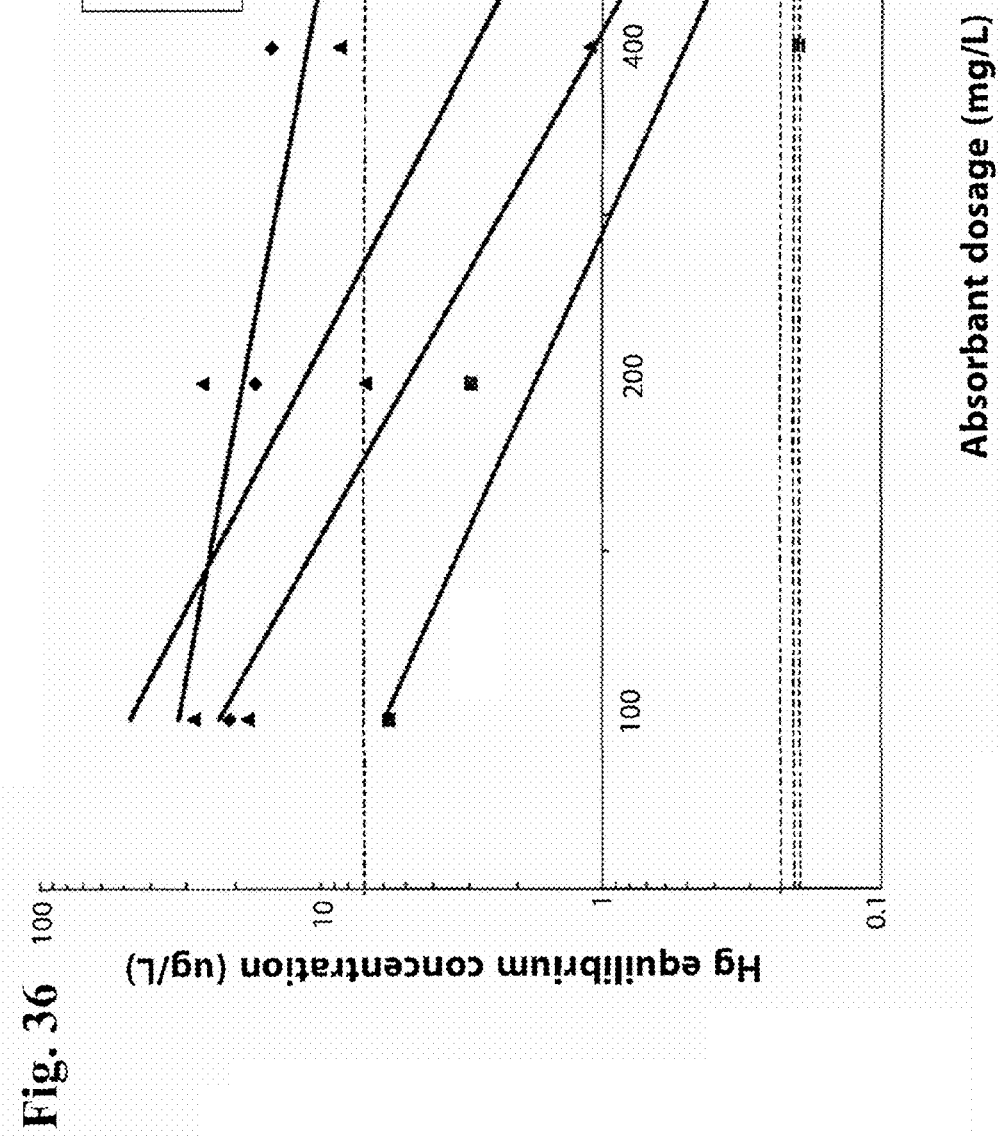
FIG. 36 illustrates the mercury adsorption of the TCWO-RD sample in comparison to other materials.

The initial concentration of Mercury in the wastewater used for the evaluation was 24 µg/L. The results of these tests are presented as FIG. 35. The TCWO-RD material was also tested using the same isotherm adsorption procedure. The TCWO-RD materials were evaluated against a sulfur-impregnated carbon (Norit RBHG3) and a powdered activated carbon (Calgon WPH 400). Each of the materials were ground with a mortar and pestle and screened to achieve similar particle size for testing. The initial concentration of mercury in the wastewater used for the evaluation was 110 µg/L. FIG. 36 provides the results of the mercury adsorption testing on the materials. The results indicate that the TCWO-RD materials adsorb mercury comparable to commercial sulfur-impregnated adsorbent.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

It is further to be understood that all values are approximate, and are provided for description.

Patents, patent applications, publications, product descriptions, and protocols are cited throughout this application, the disclosures of which are expressly incorporated herein by reference in their entireties for all purposes.

We claim:

1. A method for producing an adsorbent, comprising the steps of:
    combining a first sludge and a second material to form a mixture;
    thermally drying the mixture; and
    pyrolizing the mixture using at least four temperature zones to form the absorbent,
    wherein each temperature zone is set between about 600° C. and 1,100° C.,
    wherein at least one temperature zone is set to at least one of about 800° C., about 900° C., and about 1000° C.,
    wherein the first sludge is a municipal sludge or an industrial sludge, and wherein the second material is a compost or one of municipal sludge or industrial sludge differing from the first sludge.

2. The method of claim 1, wherein the pyrolizing step further comprises the steps of:
   setting a first temperature zone to about 600° C.;
   setting a second temperature zone to about 800° C.;
   setting a third temperature zone to about 900° C.; and
   setting a fourth temperature zone to about 1000° C.

3. The method of claim 1, wherein the drying step further comprises the steps of:
   drying the mixture in a first temperature; and
   drying the mixture in a second temperature.

4. The method of claim 3, wherein the drying step further comprises the steps of:
   setting the first temperature to about 385° C.; and
   setting the second temperature to about 230° C.

5. The method of claim 1, wherein the drying step further comprises the steps of:
   drying the mixture in a first stage; and
   drying the mixture in a second stage.

6. A method for producing an adsorbent, comprising the steps of:
   combining a first sludge and a second material to form a mixture;
   thermally drying the mixture, comprising the steps of:
      setting a first stage initial temperature;
      setting a first stage ending temperature;
      drying the mixture in a first stage;
      setting a second stage initial temperature;
      setting a second stage ending temperature; and
      drying the mixture in a second stage; and
   pyrolizing the mixture using at least four temperature zones,
   wherein the first stage initial temperature is greater than the first stage ending temperature; and
   wherein the second stage initial temperature is greater than the second stage ending temperature.

7. The method of claim 6, wherein the first stage initial temperature is not equal to the second stage initial temperature; and
   wherein the first stage ending temperature is not equal to the second stage ending temperature.

8. The method of claim 7, wherein the first stage initial temperature is about 370° C.;
   wherein the first stage ending temperature is about 230° C.;
   wherein the second stage initial temperature is about 390° C.; and
   wherein the second stage ending temperature is about 200° C.

9. The method of claim 1, wherein the compost material is at least one of tobacco waste, waste paper and wood char, or a combination thereof, and
   wherein the first sludge is industrial sludge.

10. The method of claim 1, wherein the first sludge is industrial sludge, and
    wherein the second material is municipal sludge.

* * * * *